United States Patent
Sato

(10) Patent No.: US 8,964,223 B2
(45) Date of Patent: Feb. 24, 2015

(54) SERVER APPARATUS, IMAGE PROCESSING APPARATUS, SYSTEM, INFORMATION PROCESSING METHOD AND PROGRAM

(71) Applicant: Canon Kabushiki Kaisha, Tokyo (JP)

(72) Inventor: Tomoya Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 96 days.

(21) Appl. No.: 13/714,059

(22) Filed: Dec. 13, 2012

(65) Prior Publication Data

US 2013/0163041 A1    Jun. 27, 2013

(30) Foreign Application Priority Data

Dec. 22, 2011    (JP) .................................. 2011-281986

(51) Int. Cl.
| | | |
|---|---|---|
| G06F 15/00 | (2006.01) | |
| G06K 15/02 | (2006.01) | |
| H04N 1/00 | (2006.01) | |
| H04N 1/32 | (2006.01) | |
| H04L 29/08 | (2006.01) | |

(52) U.S. Cl.
CPC ........ *G06K 15/1805* (2013.01); *H04N 1/00344* (2013.01); *H04N 1/00973* (2013.01); *H04N 1/32122* (2013.01); *H04N 1/32502* (2013.01); *H04L 67/125* (2013.01); *H04N 2201/3276* (2013.01); *H04N 2201/3204* (2013.01); *H04N 2201/0094* (2013.01); *H04N 2201/3278* (2013.01); *H04N 2201/3205* (2013.01)
USPC ....................................................... 358/1.15

(58) Field of Classification Search
CPC .................. H04N 1/00204; H04N 2201/0082
USPC ....................................................... 358/1.15
See application file for complete search history.

(56) References Cited

U.S. PATENT DOCUMENTS

| | | | |
|---|---|---|---|
| 8,111,414 B2 | 2/2012 | Sato | |
| 2007/0139698 A1 | 6/2007 | Sato | |
| 2008/0244043 A1* | 10/2008 | Kawai | ........................... 709/221 |
| 2009/0021780 A1 | 1/2009 | Sato | |

FOREIGN PATENT DOCUMENTS

JP    2007-130838    5/2007

* cited by examiner

*Primary Examiner* — Saeid Ebrahimi Dehkordy
(74) *Attorney, Agent, or Firm* — Fitzpatrick, Cella, Harper & Scinto

(57) ABSTRACT

The object is to enable configuration data, including a setting value of a setting item adopted as a local prioritized setting, to be carried over to a new image processing apparatus when replacing an image processing apparatus with the new one. The object is achieved by generating, as the setting value of the setting item adopted as the local prioritized setting, the value of virtual configuration data of a replacing apparatus using the value of virtual configuration data of an image processing apparatus specified as a replacement target.

11 Claims, 17 Drawing Sheets

| SETTING VALUE IDENTIFIER | VALUE | LOCAL PRIORITIZED SETTING FLAG |
|---|---|---|
| ccpy_settings.nup | 2in1 | 0 |
| device_settings.cloud_address | "http://canon.com/config" | 0 |
| device_settings.sleep_time | 10 MIN | 0 |
| fax_settings.received_print | OFF | 1 |
| box_settings.server_address | "http://192.168.1.1/server/" | 1 |
| network_settings.host_name | " " | 1 |
| network_settings.domain_name | " " | 1 |

| NOTIFICATION FLAG | NO |
|---|---|

| DATA TYPE | VALUE |
|---|---|
| MODEL CODE | 0x01 |
| FIRMWARE VERSION | 00.01 |
| DEVICE IDENTIFIER | 010001 |
| FAX UNIT | NONE |

| DATA TYPE | VALUE |
|---|---|
| MODEL CODE | 0x01 |
| FIRMWARE VERSION | 00.01 |
| DEVICE IDENTIFIER | 010002 |
| FAX UNIT | PROVIDED |

| DATA TYPE | VALUE |
|---|---|
| MODEL CODE | 0x02 |
| FIRMWARE VERSION | 01.00 |
| DEVICE IDENTIFIER | 020001 |
| FAX UNIT | PROVIDED |

FIG. 6

| DEVICE IDENTIFIER | TENANT IDENTIFIER | VIRTUAL APPLIANCE ELEMENT DATA | VIRTUAL CONFIGURATION DATA | NOTIFICATION FLAG |
|---|---|---|---|---|
| 010001 | 100 | 1 | 1 | NO |
| 010002 | 100 | 2 | 2 | NO |
| 020001 | 100 | 3 | 3 | YES |
| 010010 | 200 | 4 | 4 | YES |

FIG. 7A

| SETTING VALUE IDENTIFIER | DEFAULT VALUE | VALUE RANGE | CONDITION |
|---|---|---|---|
| copy_settings.nup | 1in1 | 1 in 1, 2 in 1, 4 in 1 | NONE |
| device_settings.cloud_address | "http://canon.com/config" | 256 BYTES | NONE |
| device_settings.sleep_time | 10 MIN | 1 MIN, 10 MIN, 1 HR | NONE |
| fax_settings.received_print | OFF | OFF, Tray1, Tray2, Tray3 | FAX UNIT |
| box_settings.server_address | " " | 256 BYTES | NONE |
| network_settings.host_name | " " | 256 BYTES | NONE |
| network_settings.domain_name | " " | 256 BYTES | NONE |

FIG. 7B

| SETTING VALUE IDENTIFIER | DEFAULT VALUE | VALUE RANGE | CONDITION |
|---|---|---|---|
| copy_settings.nup | 1in1 | 1 in 1, 2 in 1, 4 in 1 | NONE |
| device_settings.cloud_address | "http://canon.com/config" | 256 BYTES | NONE |
| device_settings.sleep_time | 10 SEC | 10 SEC, 1 MIN, 10 MIN, 1 HR | NONE |
| fax_settings.received_print | OFF | OFF, Tray1, Tray2, Tray3 | FAX UNIT |
| network_settings.host_name | " " | 256 BYTES | NONE |
| network_settings.domain_name | " " | 256 BYTES | NONE |

FIG. 8

| SETTING VALUE IDENTIFIER | VALUE | LOCAL PRIORITIZED SETTING FLAG |
|---|---|---|
| ccpy_settings.nup | 2in1 | 0 |
| device_settings.cloud_address | "http://canon.com/config" | 0 |
| device_settings.sleep_time | 10 SEC | 0 |
| fax_settings.received_print | Tray1 | 1 |
| box_settings.server_address | "http://192.168.1.1/server/" | 1 |
| network_settings.host_name | " " | 1 |
| network_settings.domain_name | " " | 1 |

FIG. 9 http://canon.com/config/tenant_setting/100.html

NETWORK SETTING     LOCAL PRIORITIZED SETTING FLAG

| | | |
|---|---|---|
| HOST NAME | | 1 |
| DOMAIN NAME | | 1 |
| LPD PRINTING | ON | 0 |

UPDATE   RETURN

| SETTING VALUE IDENTIFIER | VALUE | LOCAL PRIORITIZED SETTING FLAG |
|---|---|---|
| ccpy_settings.nup | 2in1 | 0 |
| device_settings.cloud_address | "http://canon.com/config" | 0 |
| device_settings.sleep_time | 10 MIN | 0 |
| fax_settings.received_print | OFF | 1 |
| box_settings.server_address | "http://192.168.1.1/server/" | 1 |
| network_settings.host_name | " " | 1 |
| network_settings.domain_name | " " | 1 |

| SETTING VALUE IDENTIFIER | VALUE | LOCAL PRIORITIZED SETTING FLAG |
|---|---|---|
| ccpy_settings.nup | 2in1 | 0 |
| device_settings.cloud_address | "http://canon.com/config" | 0 |
| device_settings.sleep_time | 10 MIN | 0 |
| fax_settings.received_print | Tray1 | 1 |
| box_settings.server_address | "http://192.168.1.1/server/" | 1 |
| network_settings.host_name | " " | 1 |
| network_settings.domain_name | " " | 1 |

| SETTING VALUE IDENTIFIER | VALUE | LOCAL PRIORITIZED SETTING FLAG |
|---|---|---|
| ccpy_settings.nup | 2in1 | 0 |
| device_settings.cloud_address | "http://canon.com/config" | 0 |
| device_settings.sleep_time | 10 SEC | 0 |
| fax_settings.received_print | Tray1 | 1 |
| network_settings.host_name | " " | 1 |
| network_settings.domain_name | " " | 1 |

702 / 703 / 704

FIG. 11 http://canon.com/config/virtualdevice_setting/list.html

VIRTUAL DEVICE LIST

| | MODEL NAME | TENANT IDENTIFIER | VIRTUAL APPLIANCE ELEMENT DATA | VIRTUAL CONFIGURATION DATA |
|---|---|---|---|---|
| | printer1 | 100 | 1 | 1 |
| | printer1 | 100 | 2 | 2 |
| | printer2 | 100 | 3 | 3 |
| | printer3 | 200 | 4 | 4 |

1301

RETURN

FIG. 12 http://canon.com/config/virtualdevice_setting/010001.html

NETWORK SETTING

HOST NAME ☐

DOMAIN NAME ☐

LPD PRINTING [ON ▼]

1401

[UPDATE] [RETURN]

FIG. 16A

REGISTRATION OF NEW DEVICE

PLEASE INPUT TENANT IDENTIFIER AND IDENTIFIER OF DEVICE TO BE REGISTERED

TENANT IDENTIFIER: 100 ~1601

1602 — ○ REGISTER DEVICE IDENTIFIER
　　　　　IDENTIFIER: AAA123456 ~1604

1603 — ● REGISTER USING TEMPORARY IDENTIFIER
　　　　　TEMPORARY IDENTIFIER: ZZZ999999　[ISSUE TEMPORARY IDENTIFIER] ~1605
　　　　　　　　　　　　　　　　1606
　　　　　　　　　　　　　　　　　　　[REGISTER DEVICE] [CANCEL]
　　　　　　　　　　　　　　　　　　　　　1607　　　　1608

FIG. 16B

SETTING OF IMAGE PROCESSING APPARATUS TO BE REPLACED

DEVICE TO BE REGISTERED
1651 — 　IDENTIFIER: NOT SET
　　　　TEMPORARY IDENTIFIER: ZZZ999999

PLEASE SELECT DEVICE TO BE REPLACED

| SELECT | DEVICE IDENTIFIER | MODEL | DEVICE NAME | INSTALLATION LOCATION |
|---|---|---|---|---|
| ● | AAA111111 | iR 12345 | COPIER A | OFFICE ROOM 11 |
| ○ | BBB222222 | iR 11111 | COPIER B | OFFICE ROOM 12 |
| ○ | CCC333333 | iR 11111 | COPIER C | CONFERENCE ROOM 13 |
| ○ | DDD444444 | iR 22222 | FAX D | CONFERENCE ROOM 14 |
| ○ | EEE555555 | iR 12345 | COPIER E | OFFICE ROOM 21 |

1652

[OK] ~1653

| TEMPORARY DEVICE IDENTIFIER | DEVICE IDENTIFIER TO BE REPLACED |
|---|---|
| ZZZ999999 | AAA111111 |
| ZZZ999999 | BBB222222 |
| AAA123456 | CCC333333 |

FIG. 20

PLEASE INPUT TEMPORARY IDENTIFIER IF KNOWN

2001— TENANT IDENTIFIER: 100
DEVICE IDENTIFIER: AAA123456
TEMPORARY IDENTIFIER: ZZZ999999  —2002

2003   2004
SEND TO SETTING VALUE MANAGEMENT SERVICE | CANCEL

FIG. 21

SETTING OF IMAGE PROCESSING APPARATUS TO BE REPLACED

DEVICE TO BE REGISTERED
 IDENTIFIER: NOT SET
 TEMPORARY IDENTIFIER: ZZZ999999

PLEASE SELECT DEVICE TO BE REPLACED

| PRIORITY RANK | DEVICE IDENTIFIER | MODEL | DEVICE NAME | INSTALLATION LOCATION |
|---|---|---|---|---|
|  | AAA111111 | iR 12345 | COPIER A | OFFICE ROOM 11 |
| 1 | BBB222222 | iR 11111 | COPIER B | OFFICE ROOM 12 |
|  | CCC333333 | iR 11111 | COPIER C | CONFERENCE ROOM 13 |
| 2 | DDD444444 | iR 22222 | FAX D | CONFERENCE ROOM 14 |
|  | EEE555555 | iR 12345 | COPIER E | OFFICE ROOM 21 |

| TEMPORARY DEVICE IDENTIFIER (2201) | DEVICE TO BE REPLACED 1 (2202) | DEVICE TO BE REPLACED 2 (2203) | DEVICE TO BE REPLACED 3 (2204) |
|---|---|---|---|
| ZZZ999999 | AAA111111 | DDD666666 | FFF777777 |
| ZZZ888888 | BBB222222 | – | – |
| AAA123456 | CCC333333 | EEE555555 | – |

FIG. 23A 2301A

| SETTING VALUE IDENTIFIER | VALUE | LOCAL PRIORITIZED SETTING FLAG |
|---|---|---|
| ccpy_settings.nup | 2in1 | 0 |
| device_settings.cloud_address | "http://canon.com/config" | 0 |
| device_settings.sleep_time | 10 MIN | 0 |
| fax_settings.received_print | OFF | 1 |
| network_settings.host_name | "hostA" | 1 |
| network_settings.domain_name | "domainA" | 1 |

FIG. 23B 2301B

| SETTING VALUE IDENTIFIER | VALUE | LOCAL PRIORITIZED SETTING FLAG |
|---|---|---|
| ccpy_settings.nup | 2in1 | 0 |
| device_settings.cloud_address | "http://canon.com/config" | 0 |
| device_settings.sleep_time | 10 MIN | 0 |
| fax_settings.received_print | Tray2 | 1 |
| box_settings.server_address | "http://192.168.1.3/server/" | 1 |
| network_settings.host_name | "hostB" | 1 |
| network_settings.domain_name | "domainB" | 1 |

FIG. 23C 2301C

| SETTING VALUE IDENTIFIER | VALUE | LOCAL PRIORITIZED SETTING FLAG |
|---|---|---|
| ccpy_settings.nup | 2in1 | 0 |
| device_settings.cloud_address | "http://canon.com/config" | 0 |
| device_settings.sleep_time | 10 MIN | 0 |
| fax_settings.received_print | Tray2 | 1 |
| box_settings.server_address | "http://192.168.1.3/server/" | 1 |
| network_settings.host_name | "hostA" | 1 |
| network_settings.domain_name | "domainA" | 1 |

SERVER APPARATUS, IMAGE PROCESSING APPARATUS, SYSTEM, INFORMATION PROCESSING METHOD AND PROGRAM

BACKGROUND OF THE INVENTION

1. Field of the Invention

The present invention relates to a server apparatus, an image processing apparatus, a system, an information processing method and a program.

2. Description of the Related Art

With respect to image forming apparatuses, there are some that store configuration data which is a setting value for switching operations. Since the configuration data is stored in a storage apparatus provided in each image forming apparatus, setting has to be performed for as many image forming apparatuses as there are to change the configuration data in all the image forming apparatuses. To avoid this inconvenience, there is a technique of setting the configuration data in a plurality of image forming apparatuses in a centralized manner by an information processing apparatus. Also, there is a technique of managing the configuration data in a centralized manner by placing the configuration data in a location that can be referenced over a network and by a plurality of image forming apparatuses referring to the same configuration data (Japanese Patent Application Laid-Open No. 2007-130838).

However, there is an issue that the technique cannot be applied to configuration data where a restriction is imposed on the value depending on the model of the image forming apparatus, the hardware option of the image forming apparatus, or the like. In view of this, a method for enabling centralized management of all the pieces of configuration data even with different models or different hardware options is being considered.

Also, provision of a cloud service for management of configuration data of a plurality of image forming apparatuses by a server on the Internet is being considered where the image forming apparatuses refer to the configuration data managed by the cloud service and perform operation. This allows setting to be performed in a centralized manner without being restricted by the physical locations at which the image forming apparatuses are installed.

However, even if a method as described above that allows centralized management is provided, setting is desirably performed separately for each image forming apparatus, depending on a setting item. A setting item of a setting that is valid for an image forming apparatus is referred to as a "local prioritized setting item."

As a setting item adopted as the local prioritized setting item, a setting item for improving the usability of "the image forming apparatus in question" may be conceived. This is a setting regarding the output destination of each type of job such as copy, fax reception or report printing, for example. Also, even if the configuration data is managed in a centralized manner, there are setting items that are to be separately set. These items are also adopted as the local prioritized setting items. These are apparatus names, installation locations and network settings, for example. Furthermore, a mode is also enabled according to which only the minimum items desired to be made common are set in a centralized manner, and other setting items are made the local prioritized setting items so as to be able to be freely set for each image forming apparatus.

In a case of replacing an image forming apparatus with a new one, there is a desire to carry over the configuration data, including the setting values of setting items adopted as the local prioritized settings described above, but a method of carrying over the local prioritized setting items is not provided. That is, in a case of replacing an image forming apparatus with a new one, there is a problem that setting items adopted as the local prioritized setting items in the image forming apparatus before the replacement have to be manually set again in the image forming apparatus after the replacement.

SUMMARY OF THE INVENTION

The present invention has been made in view of the problems above, and has its object to enable configuration data, including a setting value of a setting item adopted as a local prioritized setting, to be carried over to a new image processing apparatus when replacing an image processing apparatus with the new one.

In order to solve the above problems, the present invention provides a server apparatus comprising: an issuance unit that issues temporary identification information; a setting unit that sets an image processing apparatus to be replaced by an image processing apparatus that is to be newly registered and that is identified by the temporary identification information issued by the issuance unit; a storage unit that stores, in a storage apparatus, the temporary identification information and identification information used for identifying the image processing apparatus to be replaced in association with one another; a receiving unit that receives a registration request from the image processing apparatus that is to be newly registered over a network; an update unit that specifies the image processing apparatus to be replaced by the identification information that is associated with the temporary identification information, and updates virtual configuration data with a local prioritized setting of the image processing apparatus to be replaced, if the temporary identification information is included in the registration request received by the receiving unit; and a transmission unit that transmits the virtual configuration data updated by the update unit to the image processing apparatus to be newly registered.

According to the present invention, configuration data, including a setting value of a setting item adopted as a local prioritized setting, is enabled to be carried over to a new image processing apparatus when replacing an image processing apparatus with the new one.

Further features of the present invention will become apparent from the following description of exemplary embodiments with reference to the attached drawings.

BRIEF DESCRIPTION OF THE DRAWINGS

FIG. 5A is a diagram (a first diagram) illustrating an example of appliance element data.

FIG. 5B is a diagram (a second diagram) illustrating an example of the appliance element data.

FIG. 5C is a diagram (a third diagram) illustrating an example of the appliance element data.

FIG. 6 is a diagram illustrating an example of a virtual device stored in a virtual device holding section.

FIG. 7A is a diagram illustrating an example of a model-specific setting value schema whose model code is 0x01.

FIG. 7B is a diagram illustrating an example of a model-specific setting value schema whose model code is 0x02.

FIG. 8 is a diagram illustrating an example of configuration data for a tenant.

FIG. 9 is a diagram illustrating an example of a screen used for updating configuration data for a tenant by a terminal apparatus 102E through a web browser.

FIG. 10A is a diagram illustrating an example of virtual configuration data for an image forming apparatus whose device identifier is 010001.

FIG. 10B is a diagram illustrating an example of virtual configuration data for an image forming apparatus whose device identifier is 010002.

FIG. 10C is a diagram illustrating an example of virtual configuration data for an image forming apparatus whose device identifier is 020001.

FIG. 11 is a diagram illustrating an example of a screen used for viewing/setting of a virtual device list by the terminal apparatus 102E through a web browser.

FIG. 12 is a diagram illustrating an example of a screen on which virtual configuration data is displayed by a web browser.

FIG. 16A is a diagram illustrating an example of a new device registration screen that is displayed in step S1501.

FIG. 16B is a diagram illustrating an example of a replacement setting screen that is displayed in step S1506.

FIG. 20 is a diagram illustrating an example of a temporary identifier input screen that is displayed on a display 205A of an image forming apparatus 101 in step S1903.

FIG. 21 is a diagram illustrating an example of a replacement setting screen of embodiment 2.

FIG. 22 is a diagram illustrating an example of a replacement information management table of embodiment 2.

FIG. 23A is a diagram illustrating an example of virtual configuration data of an image forming apparatus specified as a device to be replaced with priority rank 1.

FIG. 23B is a diagram illustrating an example of virtual configuration data of an image forming apparatus specified as a device to be replaced with priority rank 2.

FIG. 23C is a diagram illustrating an example of virtual configuration data of an image forming apparatus for a case where values are carried over according to specification of priority rank 1 and priority rank 2.

DESCRIPTION OF THE EMBODIMENTS

Figure 1:
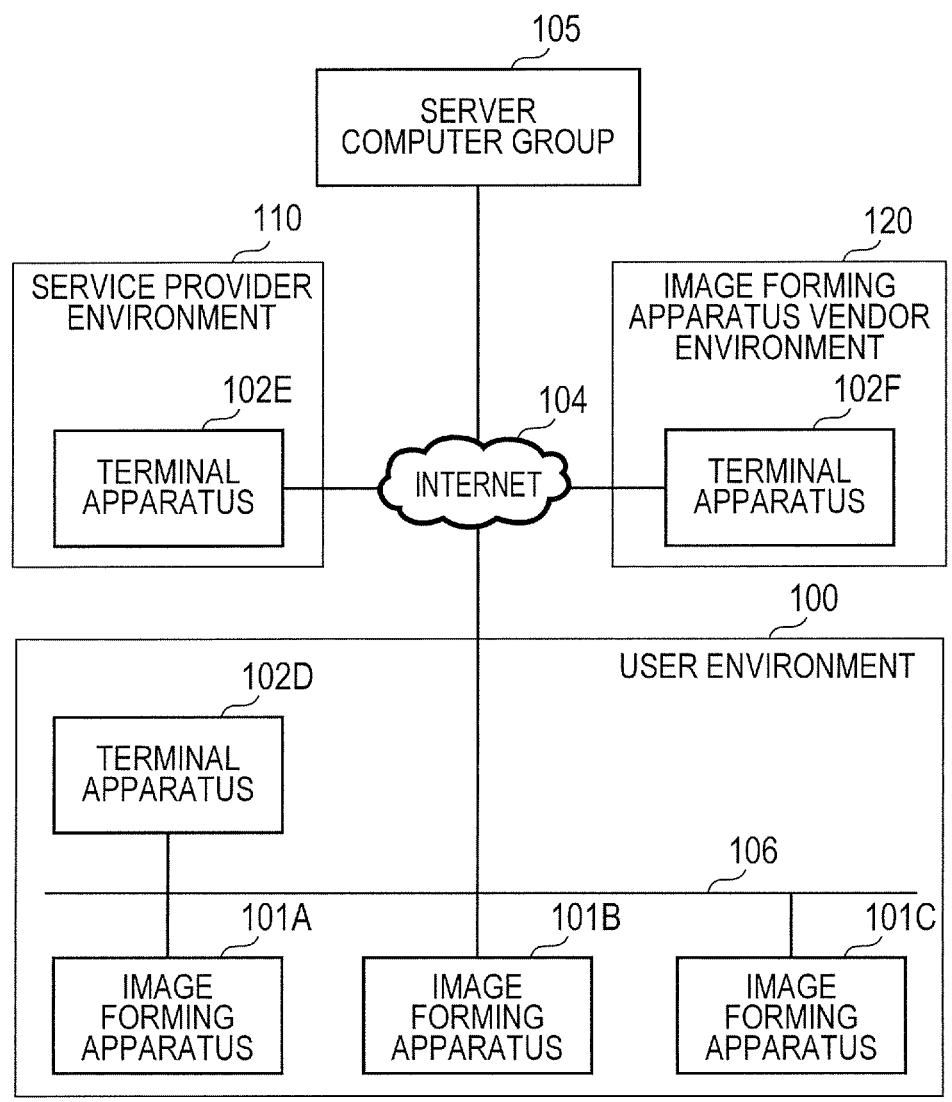
FIG. 1 is a diagram illustrating an example of a system configuration of a system.

Preferred embodiments of the present invention will now be described in detail in accordance with the accompanying drawings.

Embodiment 1

First, terms will be defined.

Configuration data is data used for switching operations of an image forming apparatus. Examples of the configuration data include a default value for imposition, which is a copy job, for example. If "1 in 1" is set, one page is printed on one sheet of paper as a result of copying. If "2 in 1" is set, two pages are printed on one sheet of paper as a result of copying.

Appliance element date is data indicating the configuration of an appliance included in an image forming apparatus. Examples of the appliance element data include data indicating whether a fax unit is attached, for example. Furthermore, examples of the appliance element data include a model code for uniquely identifying the model of an image forming apparatus, and the version of an operating firmware.

A model-specific setting value schema is data defining a schema of configuration data held by an image forming apparatus of a specific model. A schema is data defining protocols and positioning of configuration data. For example, conditions for validating a setting value identifier, a default value, a value range and data of each piece of configuration data are included in the model-specific setting value scheme. In the present embodiment, it is assumed that the configuration data that is held is different depending on the model, and that the setting value schema is prepared for each model.

A virtual device is a data group of a real device held by a server computer group. More specifically, at least the appliance element data and the configuration data are included.

A tenant is a unit of trusters of entrusted image forming apparatuses whose management is entrusted by users. Also, a tenant identifier is an identifier for unique identification of a tenant. For example, it is assumed that a company has entrusted management of image forming apparatuses 101A, 101B and 101C existing in a user environment 100. In this case, one tenant identifier corresponding to the user environment 100 is assigned, and the image forming apparatuses 101A, 101B and 101C are recognized as the image forming apparatuses belonging to the tenant and are managed. The tenant identifier is an example of tenant identification information.

Data included in the virtual device, data held by a real device and data dedicated to a tenant are defined as follows so as to be distinguished.

The appliance element data and the configuration data included in a virtual device are referred to as virtual appliance element data and virtual configuration data, respectively.

The appliance element data and the configuration data held by a real device are referred to as real appliance element data and real configuration data, respectively.

The configuration data that is desired to be used in common in a tenant is referred to as configuration data for a tenant.

The terms have been described above. The terms will be described in other sections as appropriate.

FIG. 1 is a diagram illustrating an example of a system configuration of a system of the present embodiment.

Image forming apparatuses 101A, 101B and 101C are image forming apparatuses that are to be managed. The image forming apparatuses 101A, 101B and 101C are capable of accessing an Internet 104 over a network 106. The image forming apparatus is an example of an image processing apparatus.

A terminal apparatus 102D is a computer that a user in a user environment 100 can operate, and is capable of accessing the Internet 104 over the network 106.

A terminal apparatus 102E is a computer that a service provider managing the image forming apparatuses 101A, 101B and 101C can operate, and is capable of accessing the Internet 104.

A terminal apparatus 102F is a computer that an administrator-in-charge belonging to the vendor of the image forming apparatus can operate, and is capable of accessing the Internet 104.

The Internet 104 is a network where digital communication over a public telephone network is allowed.

A server computer group 105 is a server group that provides services over the Internet 104. Additionally, the server computer group 105 may be configured from a plurality of server computers or by one server computer. Incidentally, in the following, a description will be given assuming that the server computer group 105 is configured from a plurality of server computers. The server computer group 105 is an example of a server apparatus.

The network 106 is a network of the user environment 100 that enables digital communication.

A service provider environment 110 is an environment in which the service provider performs management of the image forming apparatus using the terminal apparatus 102E.

A vendor environment 120 of the image forming apparatus is an environment in which an administrator-in-charge of the vendor manufacturing the image forming apparatuses performs maintenance of data necessary for management of the image forming apparatus using the terminal apparatus 102F.

Figure 2:
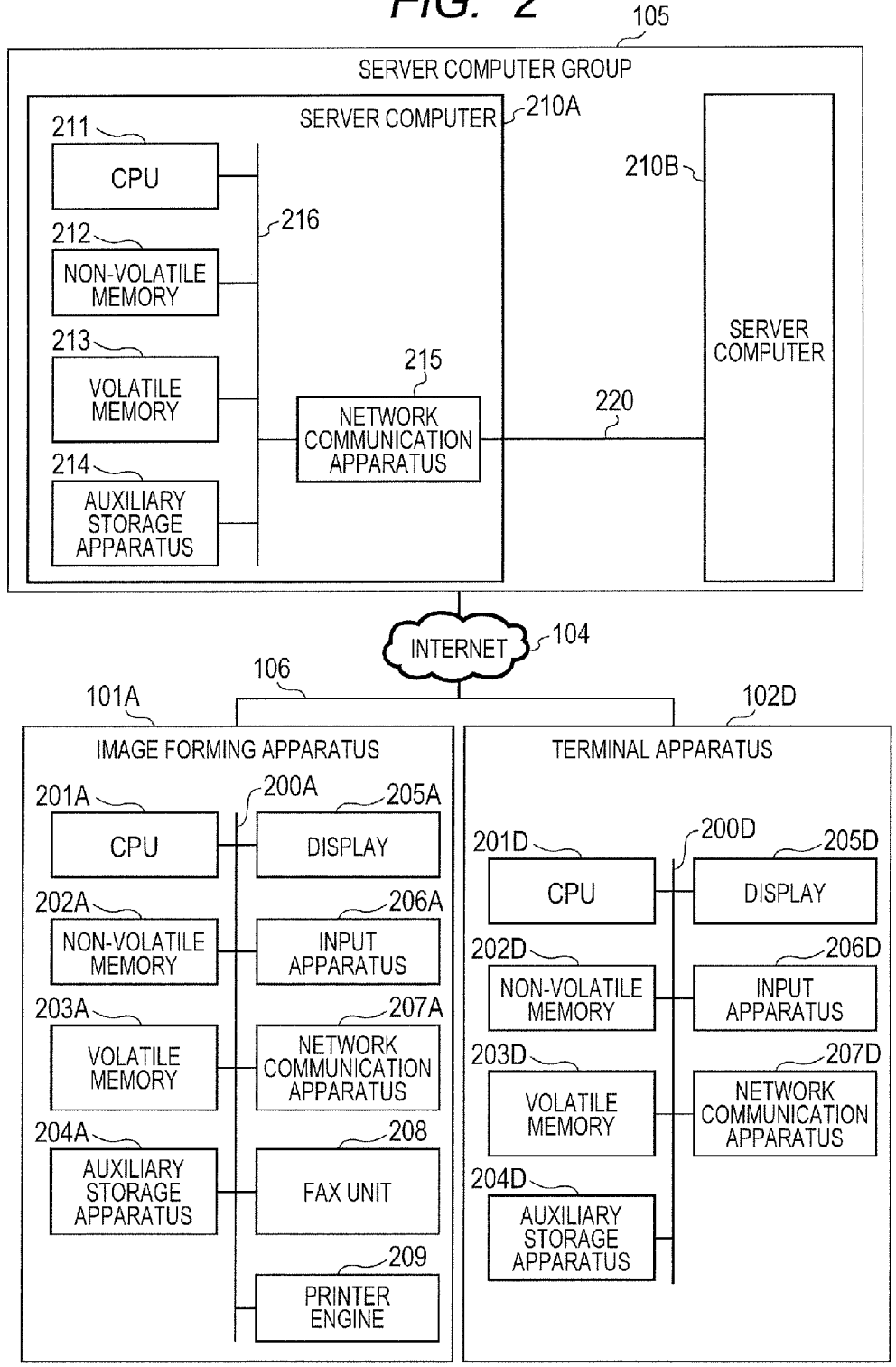
FIG. 2 is a diagram illustrating an example of a hardware configuration of each apparatus forming the system.

FIG. 2 is a diagram illustrating an example of a hardware configuration of each apparatus forming the system of the present embodiment.

A CPU 201 performs execution of programs, and control of various processes.

A non-volatile memory 202 is configured from a ROM, and a program or data necessary in the initial phase of an activation process of an appliance is stored therein.

A volatile memory 203 is configured from a RAM, and is used as a temporary storage location for programs and data.

An auxiliary storage apparatus 204 is configured from a large capacity storage apparatus such as a hard disk or a RAM drive, and keeps high capacity data and holds execution codes of programs. In contrast to the volatile memory 203, data that needs to be held for a long time is stored. Since the auxiliary storage apparatus 204 is a non-volatile storage apparatus, data can remain stored even when the power is turned off.

A display 205 is an apparatus used to convey information to a user. Additionally, as a user in the present specification, a user and a service provider are assumed.

An input apparatus 206 is an apparatus that receives a selection instruction from a user and transmits the same to a program via an internal bus 200.

A network communication apparatus 207 is an apparatus used for communication with another information processing apparatus over a network.

A fax unit 208 is a hardware unit for sending image data formed by the image forming apparatus 101 or image data stored in the auxiliary storage apparatus to another information processing apparatus over the network 106. The fax unit is an option, and is possibly not installed depending on the apparatus.

A printer engine 209 prints image data formed by the image forming apparatus 101 or image data stored in the auxiliary storage apparatus on a paper medium.

The internal bus 200 is a communication bus that connects the CPU 201, the non-volatile memory 202, the volatile memory 203, the auxiliary storage apparatus 204, the display 205, the input apparatus 206 and the network communication apparatus 207 in the image forming apparatus 101 in a communicable manner.

A server computer 210A is one of a plurality of server computers forming the server computer group 105.

An internal bus 216 is a communication bus that connects a CPU 211, a non-volatile memory 212, a volatile memory 213, an auxiliary storage apparatus 214 and a network communication apparatus 215 provided in the server computer 210A in a communicable manner.

A network 220 is a network enabling high speed communication between server computers 210 forming the server computer group 105.

Additionally, a software configuration of the server computer 210A or the server computer group 105 is realized by the CPU 211 performing a process based on a program stored in a storage apparatus such as the auxiliary storage apparatus 214. That is, a process according to a flow chart for the server computer 210A or the server computer group 105 described later in detail is realized by the CPU 211 performing a process based on a program stored in a storage apparatus such as the auxiliary storage apparatus 214.

Likewise, a software configuration of the image forming apparatus 101 is realized by a CPU 201A performing a process based on a program stored in a storage apparatus such as an auxiliary storage apparatus 204A. That is, a process according to a flow chart for the image forming apparatus 101 described later in detail is realized by the CPU 201A performing a process based on a program stored in a storage apparatus such as the auxiliary storage apparatus 204A.

Likewise, a software configuration of the terminal apparatus 102D is realized by a CPU 201D performing a process based on a program stored in a storage apparatus such as an auxiliary storage apparatus 204D. That is, a process according to a flow chart for the terminal apparatus 102D described later in detail is realized by the CPU 201D performing a process based on a program stored in a storage apparatus such as the auxiliary storage apparatus 204D.

Figure 3:
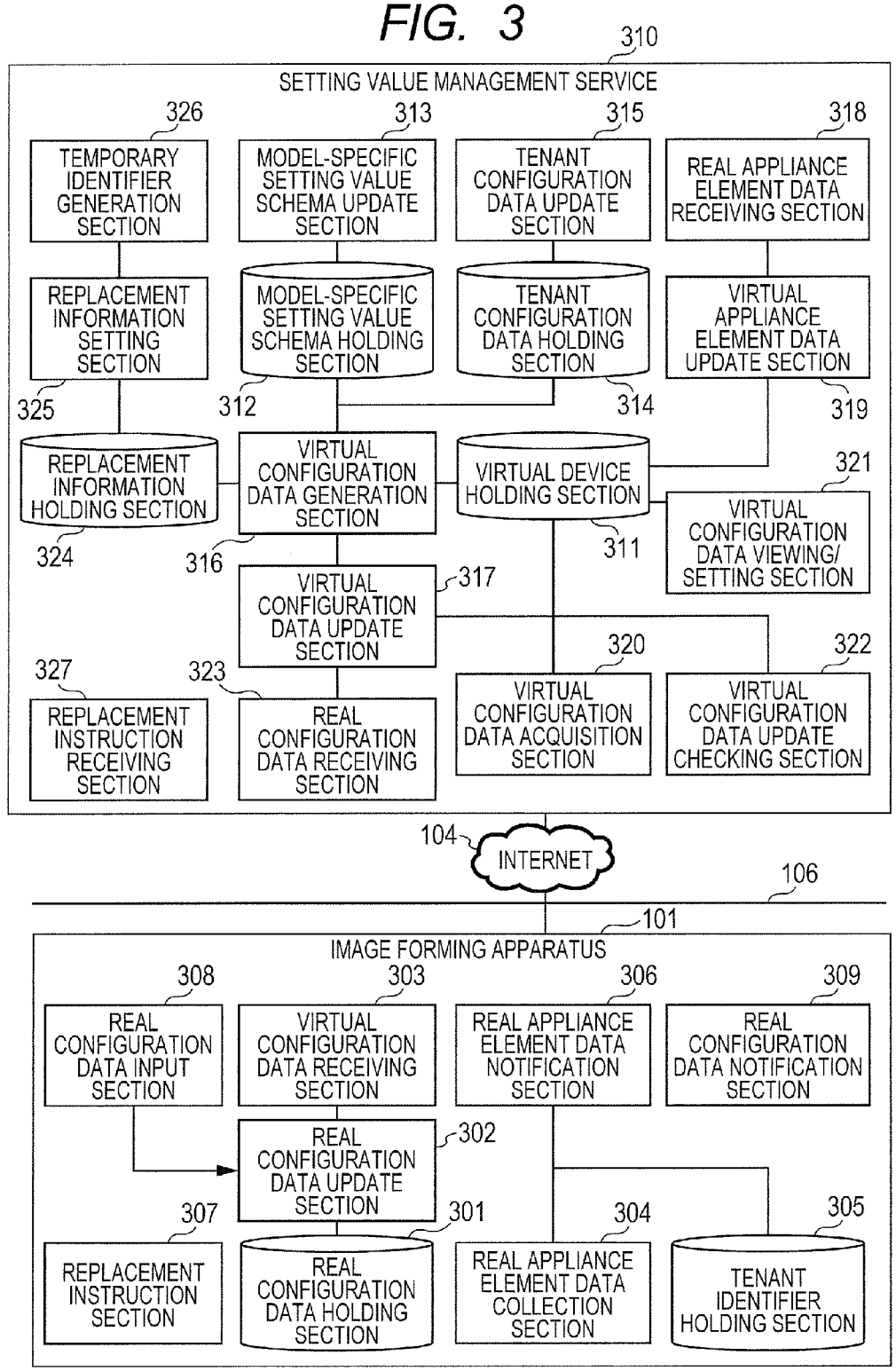
FIG. 3 is a diagram illustrating an example of a software configuration of each apparatus forming the system.

FIG. 3 is a diagram illustrating an example of a software configuration of each apparatus forming the system of the present embodiment.

First, functions (each section) of the image forming apparatus 101 will be described.

Figure 4A:
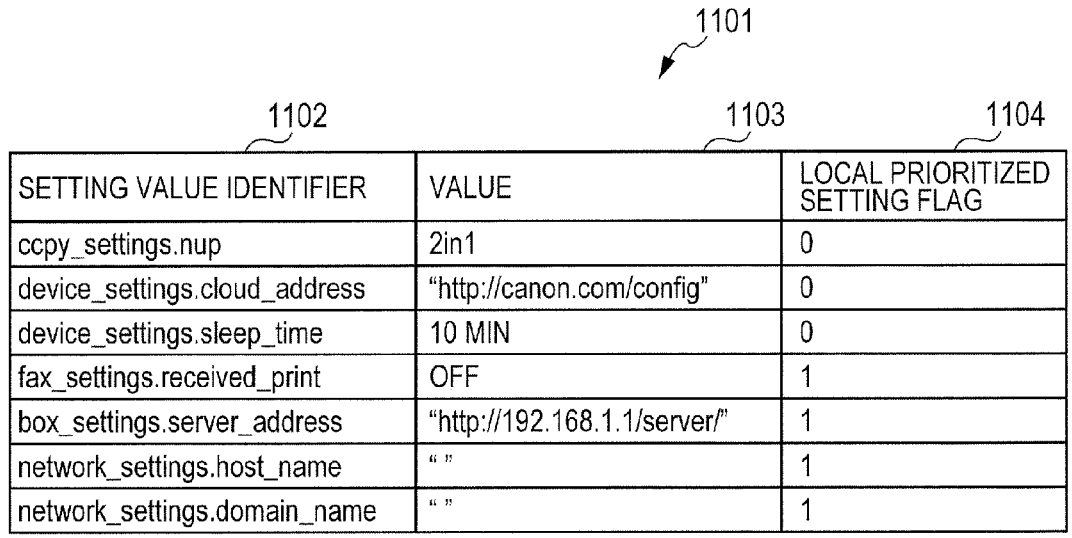
FIG. 4A is a diagram illustrating an example of real configuration data.
Figure 4B:
FIG. 4B is a diagram illustrating an example of a notification flag.

A real configuration data holding section 301 holds configuration data. The configuration data is held by the auxiliary storage apparatus 204A. The image forming apparatus switches the behavior of an operation based on real configuration data held by the real configuration data holding section 301. FIGS. 4A and 4B are examples of the real configuration data. Real configuration data 1101 has configuration data that is identified by a setting value identifier 1102, its value 1103 and a local prioritized setting flag 1104. Also, the real configuration data 1101 has a notification flag 1105 indicating whether a value of the real configuration data has been notified to a setting value management service 310. The local prioritized setting flag 1104 is the same as local prioritized setting flags 504 and 704 of configuration data 501 for a tenant and virtual configuration data 701, and will be described later in detail.

A real configuration data update section 302 updates the real configuration data held by the real configuration data holding section 301. The real configuration data update section 302 performs update based on configuration data acquired by a virtual configuration data receiving section 303 described later or configuration data input by a real configuration data input section 308 described later. When updating the configuration data by the real configuration data input section 308, the real configuration data update section 302 changes the notification flag 1105 to "no."

The virtual configuration data receiving section 303 calls up a virtual configuration data acquisition section 320 described later, and receives virtual configuration data. As the address used for calling up the virtual configuration data acquisition section 320, the virtual configuration data receiving section 303 uses an address held by the real configuration data holding section 301. More specifically, when referring to FIG. 10A described later, the virtual configuration data receiving section 303 accesses "http://canon.com/config," which is a value 703 of a setting value identifier 702, "device_settings.cloud_address."

A real appliance element data collection section 304 collects appliance element data of the image forming apparatus 101. FIGS. 5A to 5C are diagrams illustrating examples of real appliance element data. Values 603 are stored in relation to data types 602. As the appliance element data, there are a model code used for identifying a model, a firmware version, a device identifier used for identifying a device, presence/absence of a fax unit and the like.

A tenant identifier holding section 305 stores a tenant identifier of a tenant to which the image forming apparatus 101 belongs. The tenant identifier is set at the time of initially installing the image forming apparatus 101, and is stored in the auxiliary storage apparatus 204A so as not to be lost when the power is turned off.

A real appliance element data notification section 306 issues a notification regarding the real appliance element data collected by the real appliance element data collection section 304 and the tenant identifier stored by the tenant identifier holding section 305. The notification destination is a real appliance element data receiving section 318, which will be described later in detail.

The real configuration data input section 308 inputs real configuration data selected (or input) by a user or a service provider via a display 205A or an input apparatus 206A. The real configuration data which has been input is stored in the real configuration data holding section 301 by the real configuration data update section 302. Additionally, input/setting by the real configuration data input section 308 is enabled only for the setting item for which the local prioritized setting flag 1104 is set to "1." A setting item for which the local prioritized setting flag 1104 is set to "0" allows viewing only, and is controlled such that setting is not allowed.

A real configuration data notification section 309 notifies a real configuration data receiving section 323 of the real configuration data held by the real configuration data holding section 301. The real configuration data notification section 309 determines, by the notification flag 1105 of the real configuration data, whether or not there is a change in the real configuration data not yet notified to the setting value management service 310. In the case that there is a change in the real configuration data, the real configuration data notification section 309 notifies the setting value management service 310 of the real configuration data. Then, the real configuration data notification section 309 sets the notification flag 1105 to "yes." Additionally, the timing of the real configuration data notification section 309 determining whether or not there is a change in the real configuration data not yet notified to the setting value management service 310 may be the timing of turning on of the power of the image forming apparatus, or a timing specified by the user of the image forming apparatus. Also, the real configuration data notification section 309 may perform the determination at regular intervals.

A replacement instruction section 307 inputs a replacement instruction selected by a user or a service provider that is input via the display 205A or the input apparatus 206A. When a replacement instruction is issued, the replacement instruction section 307 transmits the replacement instruction including the real appliance element data collected by the real appliance element data collection section 304 and the tenant identifier stored in the tenant identifier holding section 305 to the setting value management service 310. The transmission destination is a replacement instruction receiving section 327, which will be described later in detail.

Next, functions (each section) of the setting value management service 310 will be described.

The setting value management service 310 is a service of providing a function of managing the configuration data of the image forming apparatus. The setting value management service 310 is provided on the server computer group 105 described above. The setting value management service 310 has a plurality of functions (sections), and the functions will be described below.

A virtual device holding section 311 stores data held by a virtual device.

FIG. 6 is a diagram illustrating an example of a virtual device stored in the virtual device holding section 311.

A virtual device list 801 is all of the virtual devices held by the virtual device holding section 311.

A device identifier 802 is an identifier for specifying one virtual device from a plurality of virtual devices in the virtual device list 801. The device identifier 802 is originally an identifier that is stored in the image forming apparatus 101, and is an identifier allowing unique identification of the image forming apparatus 101. A notification regarding the device identifier 802 is issued by the image forming apparatus 101 as one piece of the appliance element data.

A tenant identifier 803 is a tenant identifier of a tenant to which an image forming apparatus 101 corresponding to a virtual device belongs.

Virtual appliance element data 804 is appliance element data of the image forming apparatus 101 corresponding to the virtual device. As virtual appliance element data, the information illustrated in FIGS. 5A to 5C is separately held by the virtual device holding section 311. An identifier which is a reference to FIGS. 5A to 5C is held in the virtual appliance element data 804.

Virtual configuration data 805 is configuration data that the image forming apparatus 101 corresponding to the virtual device should refer to. As the virtual configuration data, the information illustrated in FIGS. 10A to 10C is separately held by the virtual device holding section 311. An identifier which is a reference to FIGS. 10A to 10C is held in the virtual configuration data 805.

A notification flag 806 is a flag indicating whether a notification is issued to the image forming apparatus 101 since update of the virtual configuration data.

A model-specific setting value schema holding section 312 stores a model-specific setting value schema. One model-specific setting value schema is prepared for each model of image forming apparatus.

FIGS. 7A and 7B are diagrams illustrating examples of the model-specific setting value schema.

FIG. 7A illustrates an example of the model-specific setting value schema whose model code is 0x01. Also, FIG. 7B illustrates an example of the model-specific setting value schema whose model code is 0x02.

A setting value identifier 402 is an identifier used for uniquely identifying a setting value. An identifier "copy_settings.nup" indicates a setting related to imposition regarding copy settings. If the setting value identifier 402 is the same, the setting value is of the same type even if the model is different.

A default value 403 is a definition of a default setting value for the model.

A value range 404 is a definition of a range where setting is allowed in the model. When in the value range 404 of "copy_settings.nup," that selection from the three types, "1 in 1, 2 in 1, 4 in 1," is allowed is indicated.

A condition 405 is a definition of a condition that has to be satisfied to use the setting value in the model. Since the condition 405 of "fax_settings.received_print" is "fax unit," it is indicated that the setting value is valid only when installation of a fax unit is confirmed.

A model-specific setting value schema update section 313 updates the model-specific setting value schema held by the model-specific setting value schema holding section 312. If the vendor of the image forming apparatus announces a new model, a model-specific setting value schema that corresponds to the new model is registered according to the instruction from the administrator-in-charge of the vendor. Also, in the case that there is a change in the setting value, the model-specific setting value schema update section 313 similarly updates the model-specific setting value schema.

A tenant configuration data holding section 314 holds configuration data desired to be set in the image forming apparatus held by a tenant.

FIG. 8 is a diagram illustrating an example of configuration data for a tenant.

A setting value identifier 502 is the same as the setting value identifier 402 of the model-specific setting value schema described with reference to FIGS. 7A and 7B.

A value 503 is the value of a common setting desired by the tenant. A value "2 in 1" is set in "copy_settings.nup." This indicates that "2 in 1" is desired to be set in all the image forming apparatuses that are held by the tenant.

A local prioritized setting flag 504 is a flag indicating whether or not to allow the value 503 of the setting value identifier 502 to be set in each image forming apparatus. A setting item where this flag is set to 0 indicates that a setting held by the tenant configuration data holding section 314 has to be followed. That is, it means that the setting value cannot be changed for each image forming apparatus. On the other hand, a setting item where this flag is set to 1 indicates that the setting value can be changed and adopted for each image forming apparatus. That is, it means that the setting value can be changed for each image forming apparatus by the real configuration data input section 308 of the image forming apparatus 101 or a virtual configuration data viewing/setting section 321 of the setting value management service 310.

A tenant configuration data update section 315 updates the configuration data for a tenant held by the tenant configuration data holding section 314. The configuration data for a tenant is updated by a service provider performing management of the image forming apparatus held by the tenant. An update instruction is issued from a setting screen displayed by a web browser working on the terminal apparatus 102E in the service provider environment 110.

FIG. 9 is a diagram illustrating an example of a screen used for updating the configuration data for a tenant by the terminal apparatus 102E through a web browser.

The local prioritized setting flag 504 for the configuration data for a tenant is displayed as a local prioritized setting flag 1201. A service provider is allowed to set each setting value which is common in the tenant, and also, to select and set a local prioritized setting flag "0" or "1" for each setting item from this screen.

A virtual configuration data generation section 316 generates virtual configuration data using the model-specific setting value schema, the configuration data for a tenant and the virtual appliance element data. The contents of the process will be described step by step.

First, the virtual configuration data generation section 316 acquires the virtual appliance element data from the virtual device holding section 311. The model code included in the acquired virtual appliance element data is referred to, and the model of the image forming apparatus is specified. When referring to FIG. 5A, it is decided to be a model whose model code is 0x01.

Next, the virtual configuration data generation section 316 acquires from the model-specific setting value schema holding section 312 a model-specific setting value schema matching the acquired model code. When referring to FIG. 5A, FIG. 7A matching the model code 0x01 is acquired.

Next, the virtual configuration data generation section 316 takes the setting value defined in the model-specific setting value schema as a base of the virtual configuration data. When referring to FIG. 7A, seven setting values, "copy_settings.nup," "device_settings.cloud_address," "device_settings.sleep_time," "fax_settings.received_print," "box_settings.server_address," "network_settings.host_name" and "network_settings.domain_name" are taken as the bases.

Next, the virtual configuration data generation section 316 acquires a value that is registered in the configuration data for a tenant, and decides whether it is within the value range defined in the model-specific setting value schema. When referring to FIGS. 7A and 8, since "copy_settings.nup" is "2 in 1" and the value range is "1 in 1, 2 in 1, 4 in 1," the value is within the value range. However, "device_settings.sleep_time" is "10 sec" and the value range is "1 min, 10 min, 1 hr", and thus, the value is outside the value range. When the value is outside the value range, the virtual configuration data generation section 316 acquires the default value defined in the model-specific setting value schema. In this example, the default value is "10 min."

Next, the virtual configuration data generation section 316 decides whether or not the condition defined in the model-specific setting value schema is satisfied. The virtual configuration data generation section 316 performs the decision using the appliance element data. When referring to FIG. 5A, since there is no condition regarding "copy_settings.nup," the condition of "copy_settings.nup" is satisfied. However, since the condition regarding "fax_settings.received_print" is "fax unit" and the appliance element data shows "no," the condition is not satisfied. In the case that the condition is satisfied, the virtual configuration data generation section 316 uses a value determined in the prior steps. In the case that the condition is not satisfied, the virtual configuration data generation section 316 acquires the default value 403 defined in the model-specific setting value schema. In this example, the default value is "OFF."

The values determined by the above steps are the virtual configuration data. Examples of the virtual configuration data are illustrated in FIGS. 10A to 10C. FIG. 10A is the virtual configuration data of the image forming apparatus whose device identifier is 010001. Similarly, FIG. 10B is the virtual configuration data of the image forming apparatus whose device identifier is 010002. FIG. 10C is the virtual configuration data of the image forming apparatus whose device identifier is 020001.

Additionally, if a replacement instruction is issued with respect to the image forming apparatus, the virtual configuration data generation section 316 generates the virtual configuration data using, in addition to the model-specific setting value schema, the configuration data for a tenant and the virtual appliance element data, replacement information held by a replacement information holding section 324, which will be described later in detail. The details will be given later.

A virtual configuration data update section 317 registers the virtual configuration data generated by the virtual configuration data generation section 316 in the virtual device holding section 311. The virtual configuration data update section 317 searches for a virtual device with a matching device identifier among virtual devices held by the virtual device holding section 311, and updates the virtual configuration data. Furthermore, if the notification flag 806 of the virtual device is "yes," the virtual configuration data update section 317 sets the notification flag to "no." This indicates that there is a change in the virtual configuration data, and that the image forming apparatus has to refer to the new virtual configuration data.

A real appliance element data receiving section 318 receives a notification from the real appliance element data notification section 306. The information to be notified is the real appliance element data illustrated in FIGS. 5A to 5C and the tenant identifier.

A virtual appliance element data update section 319 registers the appliance element data received by the real appliance element data receiving section 318 in a corresponding virtual device as the virtual appliance element data. A virtual device with a matching device identifier is searched for among the virtual devices held by the virtual device holding section 311, and the virtual appliance element data is updated.

A virtual configuration data acquisition section 320 receives a request over the Internet 104, and acquires virtual configuration data. The request includes at least a device identifier for specifying a virtual device. The virtual configuration data acquisition section 320 searches for a virtual device with a matching device identifier. The virtual configuration data acquisition section 320 searches for the virtual configuration data held by the retrieved virtual device, and passes the virtual configuration data to the request source.

A virtual configuration data viewing/setting section 321 receives a request over the Internet 104, and views/sets the virtual configuration data. The request is a request on the HTTP protocol. A manipulator performs viewing/setting of the virtual configuration data on an HTML page generated by the virtual configuration data viewing/setting section 321.

FIG. 11 is a diagram illustrating an example of a screen which is used for viewing/setting of a virtual device list by the terminal apparatus 102E through a web browser.

The virtual device list 801 illustrated in FIG. 6 is formed by HTML and displayed. If the service provider selects a link 1301 to the virtual configuration data, the virtual configuration data held by each virtual device is displayed.

FIG. 12 is a diagram illustrating an example of a screen on which the virtual configuration data is displayed by a web browser.

In the case that the configuration data is desired to be separately changed for each image forming apparatus, the service provider changes the setting on this screen. Additionally, with respect to configuration data, as the configuration data for a tenant, in which the local prioritized setting flag is set to "0," the value can only be displayed and cannot be changed.

In the case of changing the setting of the configuration data on this screen, the service provider inputs a value and then presses an update button 1401. The configuration data is thereby saved in the virtual device holding section 311, and the notification flag 806 is set to "no."

A real configuration data receiving section 323 receives real configuration data from the real configuration data notification section 309. When the real configuration data is received, the real configuration data receiving section 323 issues a notification to the virtual configuration data update section 317. Then, the virtual configuration data update section 317 searches for a virtual device with a matching device identifier among the virtual devices held by the virtual device holding section 311, and updates the virtual configuration data.

A virtual configuration data update checking section 322 checks whether the virtual configuration data has been updated. The virtual configuration data receiving section 303 transmits a device identifier to the virtual configuration data update checking section 322 via the Internet 104. The virtual configuration data update checking section 322 searches for a virtual device that matches the received device identifier among the virtual devices held by the virtual device holding section 311. If the notification flag 806 of the retrieved virtual device is "no," the virtual configuration data update checking section 322 decides that there has been an update in the virtual configuration data. On the other hand, if the notification flag 806 is "yes," the virtual configuration data update checking section 322 decides that there is no update in the virtual configuration data.

A replacement information setting section 325 receives a request via the Internet 104, and performs setting of replacement of the image forming apparatus. The request is a request on the HTTP protocol. The service provider performs setting of replacement of the image forming apparatus on an HTML page generated by the replacement information setting section 325.

A replacement information holding section 324 stores the image forming apparatus to be replaced set by the replacement information setting section 325 and the replacing image forming apparatus in association with one another. This information is stored in the auxiliary storage apparatus 214.

A temporary identifier generation section 326 receives the request, and responds by generating a temporary identifier of the image forming apparatus.

The temporary identifier is an example of temporary identification information.

The details of replacement information setting using the replacement information setting section 325, the replacement information holding section 324 and the temporary identifier generation section 326 will be given later.

A replacement instruction receiving section 327 receives a replacement instruction from the replacement instruction section 307 of the image forming apparatus 101. When the replacement instruction is received, the replacement instruction receiving section 327 instructs the virtual configuration data generation section 316 to generate virtual configuration data using the replacement setting held by the replacement information holding section 324.

Figure 13:
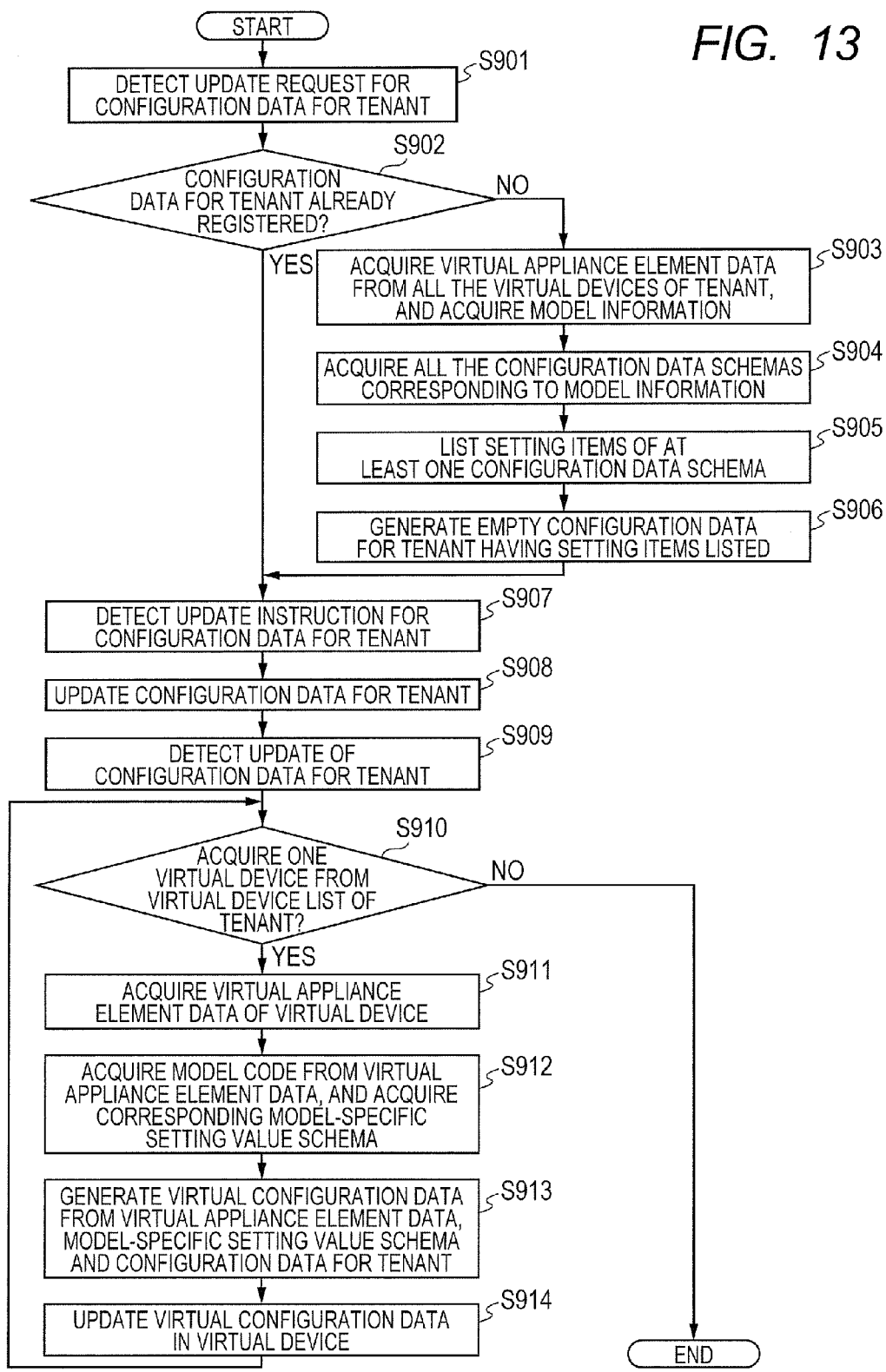
FIG. 13 is a flow chart for describing a process of updating configuration data for a tenant performed by an administrator user using a terminal apparatus 102D.

FIG. 13 is a flow chart for describing a process of updating configuration data for a tenant performed by an administrator user using the terminal apparatus 102D.

In step S901, the tenant configuration data update section 315 detects an update request for the configuration data for a tenant.

In step S902, the tenant configuration data update section 315 checks whether the configuration data for a tenant with respect to which there was the update request in step S901 is present in the tenant configuration data holding section 314. In the case that the configuration data for a tenant exists, the tenant configuration data update section 315 proceeds to step S907. In the case that the configuration data for a tenant does not exist, the tenant configuration data update section 315 proceeds to step S903.

In step S903, the tenant configuration data update section 315 searches for a virtual device held by the tenant from the virtual device holding section 311.

In step S904, the tenant configuration data update section 315 refers to the model code in the virtual appliance element data of the virtual device retrieved in step S903. Also, the tenant configuration data update section 315 searches for a model-specific setting value schema with a matching model code from the model-specific setting value schema holding section 312.

In step S905, the tenant configuration data update section 315 lists the settings of at least one of the model-specific setting value schemas retrieved in step S904.

In step S906, the tenant configuration data update section 315 generates configuration data for a tenant having the settings listed in step S905.

In step S907, the tenant configuration data update section 315 detects a specific update instruction for the configuration data for a tenant.

In step S908, the tenant configuration data update section 315 updates the configuration data for a tenant held by the tenant configuration data holding section 314 based on the update instruction detected in step S907.

In step S909, the virtual configuration data generation section 316 detects update of the configuration data for a tenant.

In step S910, the virtual configuration data generation section 316 searches for a virtual device matching the tenant identifier of the configuration data for a tenant whose update has been detected, among the virtual devices held by the virtual device holding section 311. To sequentially process the retrieved virtual devices, the virtual configuration data generation section 316 acquires one virtual device. When a virtual device is acquired, the virtual configuration data generation section 316 proceeds to step S911. When the process has been sequentially performed for all the virtual devices and a next virtual device is not acquired, the virtual configuration data generation section 316 ends the process.

In step S911, the virtual configuration data generation section 316 acquires the virtual appliance element data from a virtual device.

In step S912, the virtual configuration data generation section 316 acquires the model code from the virtual appliance element data. Furthermore, a model-specific setting value schema corresponding to the model code is searched for among the model-specific setting value schemas held by the model-specific setting value schema holding section 312.

In step S913, the virtual configuration data generation section 316 generates virtual configuration data using the virtual appliance element data, the model-specific setting value schema and the configuration data for a tenant.

In step S914, the virtual configuration data update section 317 registers the virtual configuration data generated in step S913 in the virtual device.

Figure 14:
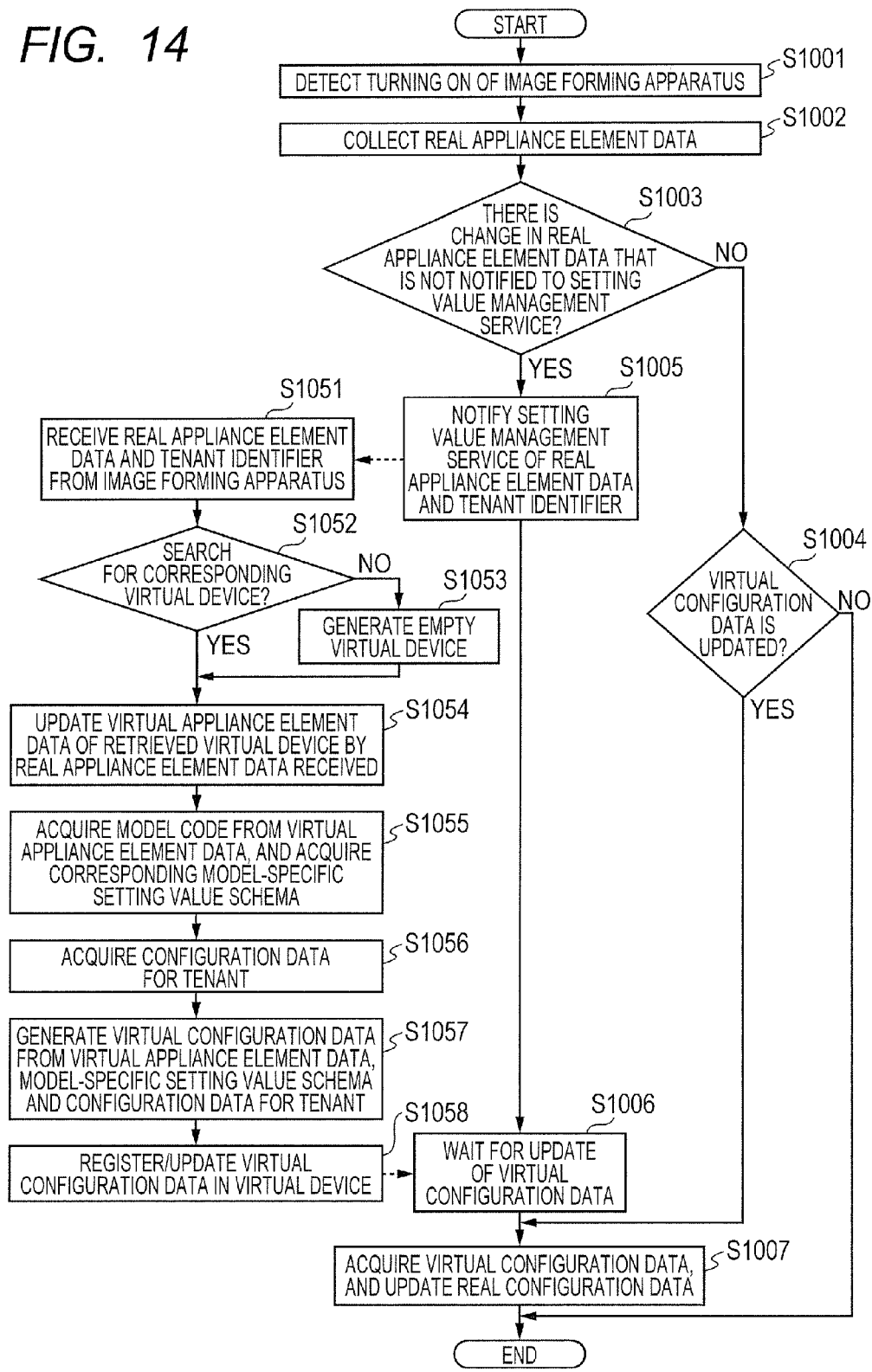
FIG. 14 is a flow chart for describing a process of acquisition of virtual configuration data by an image forming apparatus.

FIG. 14 is a flow chart for describing a process of acquisition of virtual configuration data by an image forming apparatus. The process through steps S1001 to S1007 is a process that is performed by the image forming apparatus. The process through steps S1051 to S1058 is a process that is performed by the server computer group 105.

In step S1001, the real appliance element data notification section 306 detects turning on of the image forming apparatus.

In step S1002, the real appliance element data collection section 304 collects the real appliance element data.

In step S1003, the real appliance element data notification section 306 decides, using the real appliance element data collected in step S1002, whether there is a change in the real appliance element data that is not notified to the setting value management service 310. If there is a change, the real appliance element data notification section 306 proceeds to step S1005. In the case that there is no change, the real appliance element data notification section 306 proceeds to step S1004.

In step S1004, the virtual configuration data receiving section 303 decides whether the device has already acquired the latest virtual configuration data. The virtual configuration data receiving section 303 calls up the virtual configuration data update checking section 322, and performs the decision.

In step S1005, the real appliance element data notification section 306 notifies the setting value management service 310 of the real appliance element data and the tenant identifier. The setting value management service 310 side detects the real appliance element data and the tenant identifier in step S1051, and performs a process. Details will be given later.

In step S1006, the virtual configuration data receiving section 303 suspends execution of the process until the completion of update of the virtual configuration data.

In step S1007, the virtual configuration data receiving section 303 receives the virtual configuration data from the setting value management service 310. Furthermore, the virtual configuration data update section 317 performs update taking the received virtual configuration data as the real configuration data. The real configuration data is stored in the real configuration data holding section 301.

In step S1051, the real appliance element data receiving section 318 receives the real appliance element data and the tenant identifier that the image forming apparatus has notified of.

In step S1052, the virtual appliance element data update section 319 searches for a virtual device matching the real appliance element data and the tenant identifier received in step S1051. The virtual appliance element data update section 319 performs the search among the virtual devices held by the virtual device holding section 311. In the case of the image forming apparatus communicating with the setting value management service 310 for the first time, a virtual device may not be retrieved. In the case that a matching virtual device is retrieved, the virtual appliance element data update section 319 proceeds to step S1054. In the case that a matching virtual device is not retrieved, the virtual appliance element data update section 319 proceeds to step S1053.

In step S1053, the virtual appliance element data update section 319 generates an empty virtual device.

In step S1054, the virtual appliance element data update section 319 updates the virtual appliance element data of the virtual device retrieved in step S1052 or generated in step S1053. The contents of the real appliance element data received in step S1051 are made the new virtual appliance element data.

In step S1055, the virtual configuration data generation section 316 acquires the model code from the updated virtual appliance element data. Furthermore, the virtual configuration data generation section 316 acquires a model-specific setting value schema corresponding to the model code from the model-specific setting value schema holding section 312.

In step S1056, the virtual configuration data generation section 316 acquires configuration data for a tenant. The virtual configuration data generation section 316 searches for configuration data for a tenant with a matching tenant identifier, among the pieces of configuration data for a tenant held by the tenant configuration data holding section 314.

In step S1057, the virtual configuration data generation section 316 generates virtual configuration data. The virtual configuration data generation section 316 generates the virtual configuration data using the virtual appliance element data, the model-specific setting value schema and the configuration data for a tenant.

In step S1058, the virtual configuration data update section 317 registers the virtual configuration data generated in step S1057 in the corresponding virtual device.

Next, processes of the image forming apparatus and the setting value management service at the time of replacing an image forming apparatus managed by the setting value management service 310 with another image forming apparatus will be described.

In the case of replacement, first, the setting value management service 310 newly registers a replacing image forming apparatus, and also, performs a process of setting the image forming apparatus to be replaced in association.

Figure 15:
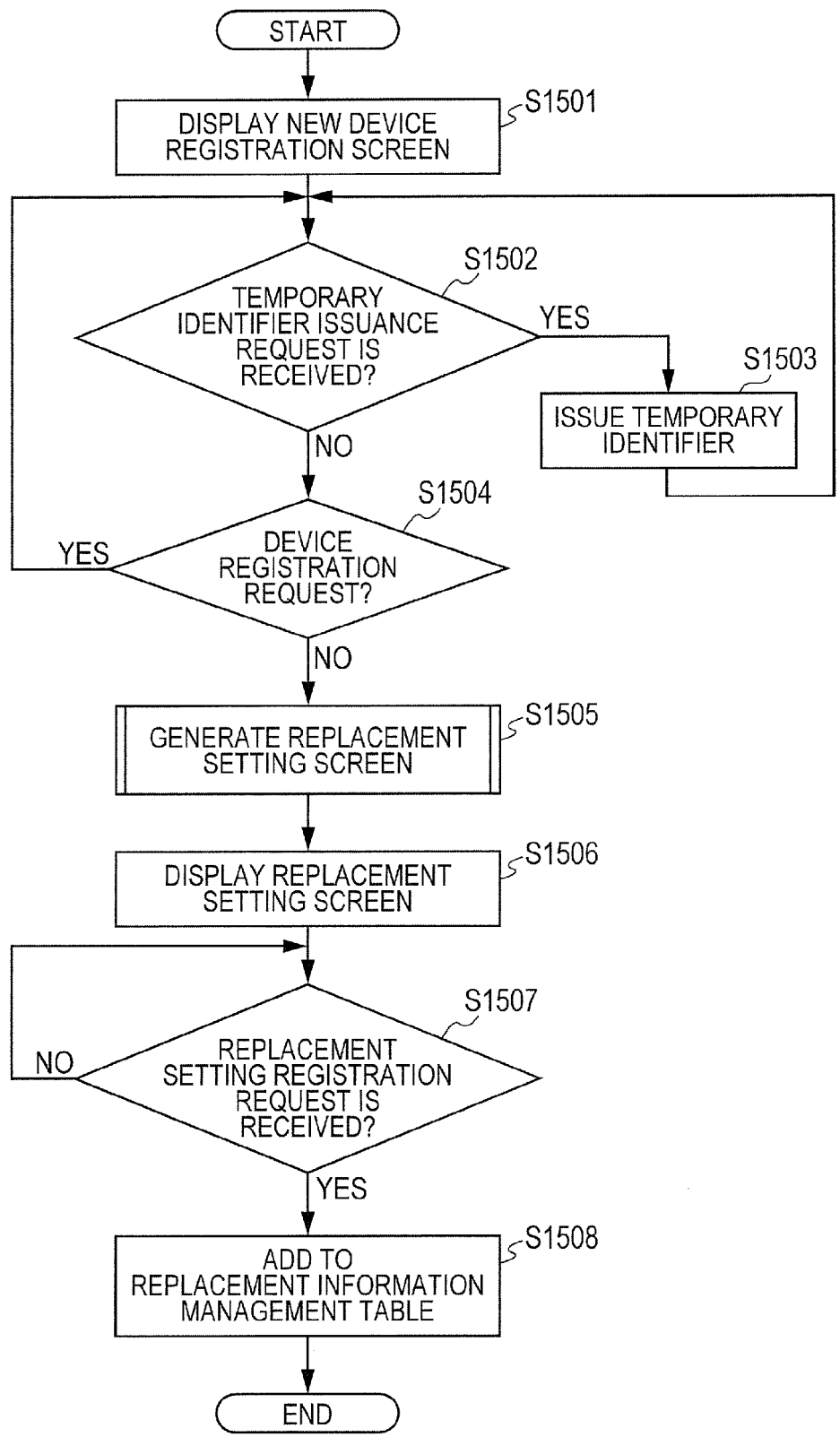
FIG. 15 is a flow chart for describing a process of newly registering, and setting in association with an image forming apparatus to be replaced, an image forming apparatus by a setting value management service 310.

FIG. 15 is a flow chart for describing a process of newly registering, and setting in association with an image forming apparatus to be replaced, an image forming apparatus by the setting value management service 310. Each step of the flow chart is a process to be performed by the server computer group 105.

In step S1501, the replacement information setting section 325 displays a screen that is used for registering an image forming apparatus that is to be newly managed by the setting value management service 310. More specifically, the replacement information setting section 325 receives a request on the HTTP protocol from a web browser of the terminal apparatus 102E in the service provider environment, and responds by generating a new device registration screen.

A new device registration screen is displayed by the web browser of the terminal apparatus 102E, which has received the response. Additionally, the new image forming apparatus that is to be registered here is a replacing image forming apparatus.

FIG. 16A is a diagram illustrating an example of the new device registration screen that is displayed in step S1501. The service provider registers a new image forming apparatus from the screen of FIG. 16A displayed by the web browser of the terminal apparatus 102E, and performs setting for replacement. Additionally, there are cases where it is difficult to specify an image forming apparatus to be newly installed until it is actually installed in the user environment. Accordingly, if the device identifier of the image forming apparatus is unknown, registration with a temporary identifier is allowed.

A box 1601 is used for inputting a tenant identifier. The service provider inputs the tenant identifier of a tenant that manages the new image forming apparatus. Radio buttons 1602 and 1603 are selected singly and exclusively. If the device identifier of the image forming apparatus to be newly registered is already known, the service provider selects the radio button 1602, and inputs the device identifier in an identifier input box 1604. If the image forming apparatus to be newly registered is not specified and the device identifier is not yet known, the radio button 1603 is selected, and a temporary identifier issuance button 1605 is pressed. When the temporary identifier issuance button 1605 is pressed, a temporary identifier issuance request is issued to the setting value management service 310, and a temporary identifier which has been issued is displayed in a section 1606. When the service provider presses a button 1607, a new device registration request is issued to the setting value management service 310. At this time, the setting value management service 310 is notified of the tenant identifier and the device identifier or information about the temporary identifier. A button 1608 is a button used for cancelling the new device registration process. Additionally, in the case that registration is performed with the temporary identifier, the service provider notifies the administrator of the user environment in which the image forming apparatus is to be installed of the temporary identifier.

The temporary identifier issuance button 1605 is an example of an object indicating issuance of temporary identifier information.

In step S1502, the replacement information setting section 325 determines whether or not the temporary identifier issuance request is received. In the case that the temporary identifier issuance request is received, that is, in the case that the temporary identifier issuance button 1605 is pressed in FIG. 16A, the replacement information setting section 325 proceeds to step S1503. In step S1503, the temporary identifier generation section 326 issues a temporary identifier and responds to the request source, and then returns to step S1502. If the temporary identifier issuance request is not received in step S1502, the replacement information setting section 325 proceeds to step S1504.

In step S1504, the replacement information setting section 325 determines whether or not the device registration request is received. In the case that the device registration request is received, that is, in the case that the button 1607 is pressed in FIG. 16A, the replacement information setting section 325 proceeds to step S1505. In the case that the device registration request is not received, the replacement information setting section 325 returns to step S1502.

In step S1505, the replacement information setting section 325 generates a replacement setting screen. The generation process of step S1505 will be described later in detail.

Subsequently, in step S1506, the replacement information setting section 325 displays the replacement setting screen. More specifically, the replacement setting screen generated in step S1505 is displayed by the web browser of the terminal apparatus 102E in the service provider environment.

FIG. 16B is a diagram illustrating an example of the replacement setting screen that is displayed in step S1506. The screen (a device selection screen) illustrated in FIG. 16B is displayed by the service provider pressing the button 1607 on the screen of FIG. 16A displayed by the web browser of the terminal apparatus 102E. The service provider performs setting of the image forming apparatus to be replaced on the screen illustrated in FIG. 16B.

A section 1651 indicates the image forming apparatus to be newly registered, and displays the identifier input on the screen of FIG. 16A or the temporary identifier. A list 1652 is used for selecting the image forming apparatus to be replaced. Each row in the list 1652 indicates an image forming apparatus which is a candidate of replacement. The rows are controlled such that only one row is exclusively selected. The service provider selects one of the image forming apparatuses displayed in the list 1652 and presses an OK button 1653 to thereby perform replacement setting. When the OK button 1653 is pressed by the service provider, a replacement setting registration request is issued to the setting value management service 310.

In step S1507, the replacement information setting section 325 determines whether or not the replacement setting registration request is received. In the case that the replacement setting registration request is received, that is, in the case that the OK button 1653 is pressed in FIG. 16B, the replacement information setting section 325 proceeds to step S1508. In step S1508, the replacement information setting section 325 adds replacement information which has been received in a replacement information management table.

Figures 17, 18:
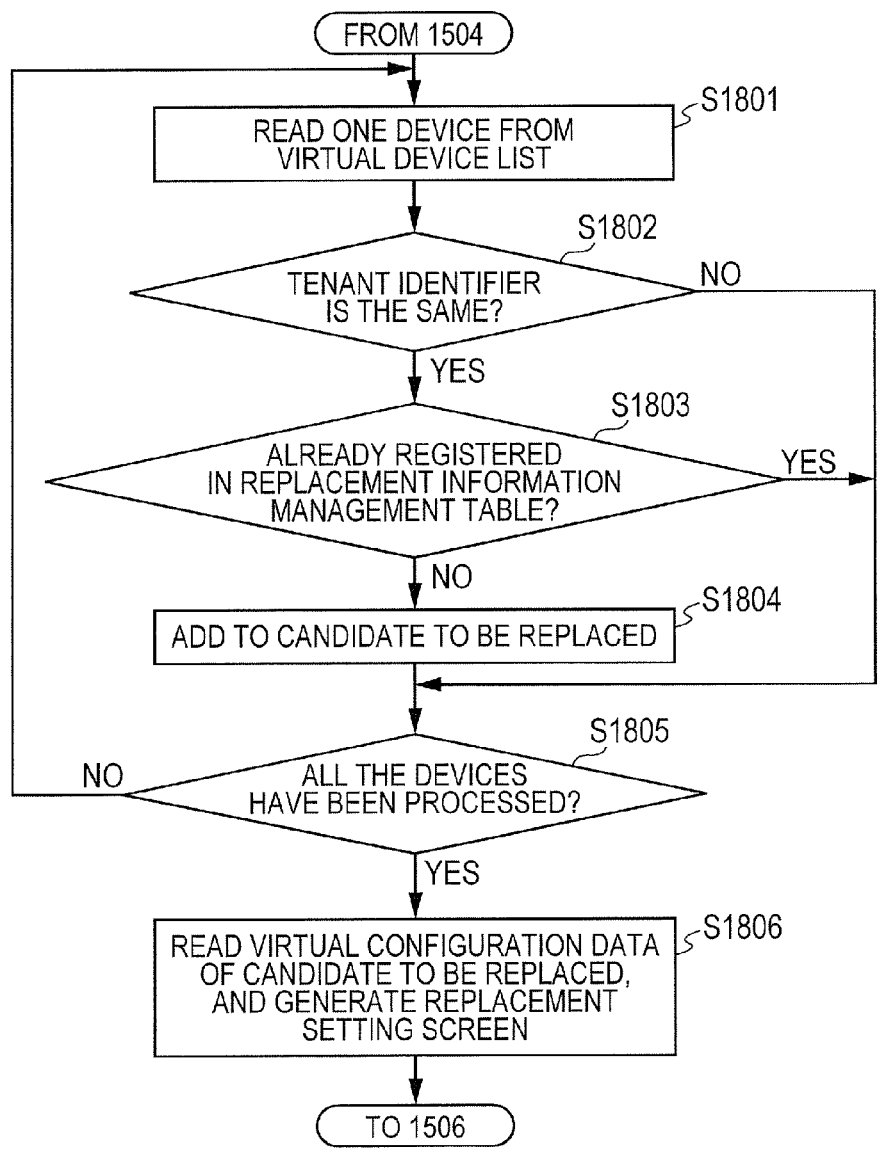
FIG. 17 is a diagram illustrating an example of a replacement information management table.
FIG. 18 is a flow chart illustrating in detail a procedure of replacement setting screen generation of step S1505.

FIG. 17 is a diagram illustrating an example of the replacement information management table. The replacement information management table holds, in sets, the device identifier of the newly registered image forming apparatus or a temporary identifier 1701 and a device identifier 1702 of a replacement target, which is the device identifier of the image forming apparatus to be replaced set to be replaced by the service provider. The device identifier is an example of identification information.

FIG. 18 is a flow chart illustrating in detail a procedure of replacement setting screen generation of step S1505. This flow chart starts from the determination of reception of the device registration request in step S1504, that is, the pressing of the button 1607 in FIG. 16A.

In S1801, the replacement information setting section 325 reads one virtual device from the list of virtual devices held by the virtual device holding section 311.

In step S1802, the replacement information setting section 325 determines whether or not the tenant identifier passed on together with the device registration request and the tenant identifier 803 of the virtual device which has been read are the same. In the case that the tenant identifiers are determined to be not the same, the replacement information setting section 325 proceeds to step S1805. In the case that the tenant identifiers are determined to be the same, the replacement information setting section 325 proceeds to step S1803.

In step S1803, the replacement information setting section 325 determines whether or not the device identifier 802 of the virtual device which has been read is already registered as the device identifier 1702 of the replacement target in the replacement information management table. In the case that the device identifier is determined to be already registered, the replacement information setting section 325 proceeds to step S1805. In the case that the device identifier is determined to be not registered, the replacement information setting section 325 proceeds to step S1804.

In step S1804, the replacement information setting section 325 holds the virtual device which has been read as a candidate of replacement, and proceeds to step S1805.

In step S1805, the replacement information setting section 325 determines whether all the virtual devices registered in the virtual device list have been read and processed. In the case that it is determined that not all the virtual devices have been processed, the replacement information setting section 325 returns to step S1801, reads the next virtual device, and repeats the process. In the case that it is determined that all the virtual devices have been processed, the replacement information setting section 325 proceeds to step S1806.

In step S1806, the replacement information setting section 325 reads the virtual configuration data of the virtual device held as the candidate of replacement, and generates a replacement setting screen. More specifically, the replacement information setting section 325 reads, and forms in an HTML format, information about the model of the virtual device which is the candidate of replacement, the device name and the installation location as shown in the list 1652 in FIG. 16B. With the above processes, a replacement setting screen is generated which displays in a list, as a candidate of replacement, an image forming apparatus which is of a tenant with the same tenant identifier as that of the image forming apparatus that is to be newly registered and which is not set as an image forming apparatus to be replaced by another image forming apparatus. Then, the replacement information setting section 325 proceeds to step S1506.

Figure 19:
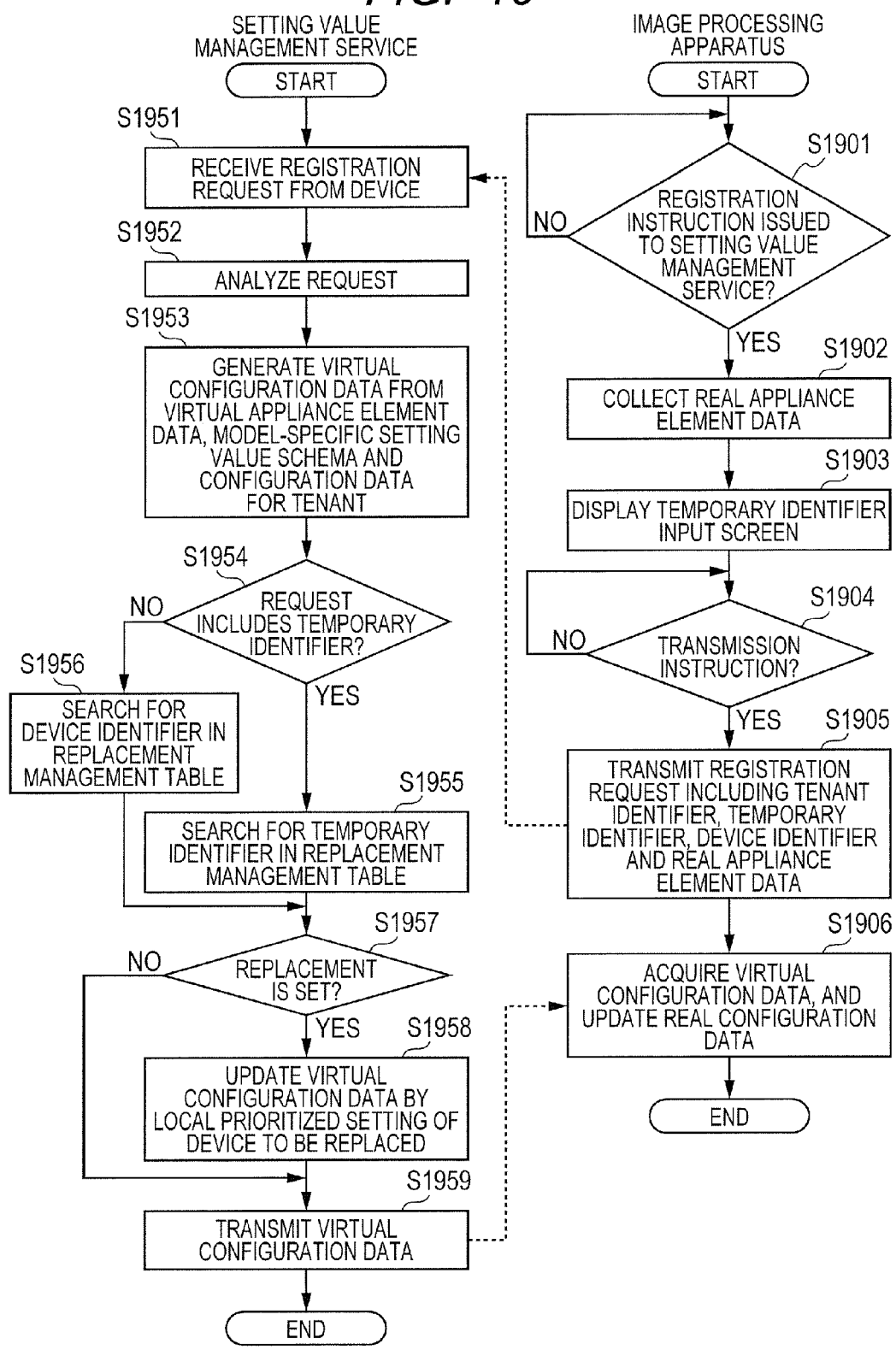
FIG. 19 is a flow chart illustrating an example of a process performed at the time of installation of a new image forming apparatus in a user environment and carrying over of virtual configuration data.

Next, a process that is performed at the time of installation of a new image forming apparatus in a user environment and carrying over of the virtual configuration data will be described based on the flow chart of FIG. 19. The process through steps S1901 to S1906 is a process performed by the image forming apparatus. The process through steps S1951 to S1959 is a process performed by the server computer group 105.

In step S1901, the replacement instruction section 307 determines whether or not a registration instruction is issued to the setting value management service 310. The registration instruction to the setting value management service 310 may be performed automatically at the time of turning on of the image forming apparatus, or it may be explicitly issued by an operation of a user. In the case that the registration instruction is determined to have been issued to the setting value management service 310, the replacement instruction section 307 proceeds to step S1902.

In step S1902, the real appliance element data collection section 304 collects the real appliance element data, and proceeds to step S1903.

In step S1903, the replacement instruction section 307 displays a temporary identifier input screen on the display 205A.

FIG. 20 is a diagram illustrating an example of the temporary identifier input screen that is displayed on the display 205A of the image forming apparatus 101 in step S1903. The tenant identifier and the device identifier of the image forming apparatus are displayed in a section 2001. An input box 2002 is used for inputting a temporary identifier. In the case that an installation personnel of the image forming apparatus 101 is notified of a temporary identifier, the installation personnel inputs the temporary identifier in the input box 2002 and presses a transmission button 2003. In the case that the temporary identifier is not known, the transmission button 2003 is pressed with the temporary identifier input box 2002 empty.

When a cancel button 2004 is pressed, the process of registration in the setting value management service 310 is ended.

In step S1904, the replacement instruction section 307 determines whether or not a transmission instruction is issued. That is, the replacement instruction section 307 determines whether or not the transmission button 2003 is pressed. In the case that a transmission instruction is determined to have been issued, the replacement instruction section 307 proceeds to step S1905.

In step S1905, the replacement instruction section 307 transmits to the replacement instruction receiving section 327 a registration request including the tenant identifier, the device identifier, the temporary identifier which has been input and the real appliance element data collected in step S1902 (registration request transmission).

In step S1906, the virtual configuration data receiving section 303 receives virtual configuration data from the setting value management service 310. Then, the real configuration data update section 302 updates the real configuration data. The real configuration data is stored in the real configuration data holding section 301.

In step S1951, the replacement instruction receiving section 327 receives the registration request transmitted from the image forming apparatus.

Then, in step S1952, the replacement instruction receiving section 327 analyzes the request received in step S1951. That is, each of the tenant identifier, the temporary identifier, the device identifier and the real appliance element data transmitted by the image forming apparatus in step S1905 is analyzed.

In step S1953, the virtual appliance element data update section 319 generates a virtual device. Then, the virtual configuration data generation section 316 generates virtual configuration data.

The process of step S1953 is the same as the process through steps S1051 to S1057 illustrated in FIG. 14.

Next, in step S1954, the replacement instruction receiving section 327 determines whether or not the request received in step S1951 includes information about the temporary identifier. In the case that the information about the temporary identifier is determined to be included, the replacement instruction receiving section 327 proceeds to step S1955. In the case that the information about the temporary identifier is determined to be not included, the replacement instruction receiving section 327 proceeds to step S1956. That is, in the case that the transmission button 2003 is pressed after there is an input to the temporary identifier input box 2002 on the screen of FIG. 20, the process proceeds to step S1955, and in the case that the transmission button 2003 is pressed with the temporary identifier input box 2002 empty, the process proceeds to step S1956.

In step S1955, the replacement instruction receiving section 327 searches for the temporary identifier which has been received in the replacement information management table. In step S1956, the replacement instruction receiving section 327 searches for the device identifier which has been received in the replacement information management table.

In step S1957, the replacement instruction receiving section 327 determines, based on the result of the search in step S1955 or step S1956, whether or not the identifier is registered in the replacement information management table. If the identifier is registered in the replacement information management table, the replacement instruction receiving section 327 proceeds to step S1958. If the identifier is not registered, the replacement instruction receiving section 327 proceeds to step S1959.

In step S1958, the virtual configuration data generation section 316 updates the virtual configuration data generated in step S1953, in response to the notification from the replacement instruction receiving section 327. More specifically, first, the virtual configuration data generation section 316 reads the setting value of a setting item whose local prioritized setting flag is "1" from the virtual configuration data of a device retrieved as the device to be replaced. Then, the virtual configuration data generation section 316 updates the setting value of the corresponding setting item of the virtual configuration data generated in step S1953 with the value which has been read.

In step S1959, the virtual configuration data acquisition section 320 transmits the virtual configuration data to the image forming apparatus. This virtual configuration data is acquired by the image forming apparatus in step S1906.

The configuration data of an image forming apparatus to be replaced for which a replacement setting has been performed is carried over to the newly installed image forming apparatus by the processes described above.

Embodiment 2

In embodiment 1, only one device can be selected as the device to be replaced, and replacement is performed in a one-to-one fashion. In embodiment 2, a plurality of devices to be replaced can be selected, and replacement may be performed in a many-to-one fashion. For example, an image forming apparatus having only the copy function (a replacement target A) and an image forming apparatus having only the fax function (a replacement target B) may be replaced by one all-in-one printer. In this case, the configuration data related to the fax function is desirably carried over from the replacement target B and other pieces of configuration data are desirably carried over from the replacement target A. This embodiment is effective in such a case.

Additionally, description about matters of the present embodiment same as those of embodiment 1 will be omitted, and only the differences will be described.

In embodiment 2, a setting screen illustrated in FIG. 21 is generated instead of the replacement setting screen generated in step S1806 illustrated in FIG. 16B. FIG. 21 is the same as FIG. 16B in that the image forming apparatuses which are the candidates of replacement are displayed in a list 2101, but, in FIG. 21, the rows are numbered in the order of selection with numbers 1, 2, 3, etc., in a priority rank section 2102. When an OK button 2103 is pressed, the device identifier of the selected image forming apparatus to be replaced is transmitted to the setting value management service 310 together with the priority rank, and a replacement setting registration request is issued.

FIG. 22 is a diagram illustrating an example of a replacement information management table of embodiment 2. The device identifiers of the image forming apparatuses to be replaced set to be replaced by the service provider with respect to the device identifier of a newly registered image forming apparatus or a temporary identifier 2201 are held according to the priority ranks in 2202, 2203, 2204, etc. The example of FIG. 22 shows that setting values of image processing apparatuses whose identifiers are AAA111111, DDD666666 and FFF777777 are carried over to a device, ZZZ999999, in this order according to the priority ranks.

Next, the process that is performed in step S1958 in embodiment 2 will be described.

First, the virtual configuration data generation section 316 updates a local prioritized setting item using the virtual configuration data of the image forming apparatus that is specified as the device to be replaced with priority rank 1 (same as the first embodiment). Here, depending on the appliance element such as the model or the installed options of the device to be replaced with priority rank 1, there may be a setting item not included in the model-specific setting value schema or there may be a setting value rounded to a default. If there is such an item, if a device to be replaced with priority rank 2 is specified, the virtual configuration data generation section 316 updates the setting value using its virtual configuration data.

FIGS. 23A to 23C illustrate examples of carrying over of setting values where the devices to be replaced with priority 1 and priority 2 are specified.

FIG. 23A illustrates virtual configuration data of an image forming apparatus specified as a device to be replaced with priority rank 1. The model code of this device is 0x02, and the device does not include a fax unit. Accordingly, a setting of a setting value identifier "box_settings.server_address" does not exist, and the setting of "fax_settings.received_print" is set to OFF, which is a default value. The "network_settings.host_name" and "network_settings.domain_name" are local prioritized settings, and values "hostA" and "domainA" are set, respectively.

FIG. 23B illustrates virtual configuration data of an image forming apparatus specified as a device to be replaced with priority rank 2. The model code of this device is 0x01, and the device includes a fax unit. Accordingly, a setting of a setting value identifier "box_settings.server_address" is present, and the setting of "fax_settings.received_print" is valid. These are local prioritized settings, and values "http://192.168.1.3/server/" and "Tray2" are set, respectively.

Furthermore, values "hostB" and "domainB" are set for "network_settings.host_name" and "network_settings.domain_name," respectively.

FIG. 23C illustrates virtual configuration data of an image forming apparatus for a case where values are carried over according to specification of priority rank 1 and priority rank 2. The model code of this device is 0x01, and the device includes a fax unit. The values of "network_settings.host_name" and "network_settings.domain_name" are carried over from a device A with priority rank 1. On the other hand, the values of settings "box_settings.server_address" and "fax_settings.received_print" are carried over from a device B with priority rank 2, not from the device A with priority rank 1.

Additionally, a device to be replaced may be set for each setting item without ranking and specifying a plurality of devices to be replaced. Alternatively, a device to be replaced may be specified for each category of setting item. In this case, a category is set for each setting item, enabling specification of carrying over from the device A with respect to a setting item whose category is copy and carrying over from the device B with respect to a setting item whose category is fax, for example.

In any case, carrying over of a setting value is realized by setting the setting value of the virtual configuration data of a device to be replaced as the setting value of the virtual configuration data of a new device, with respect to each setting item which is a local prioritized setting.

Additionally, in the case that replacement is performed using a plurality of image processing apparatuses, which apparatus's setting value has been carried over with respect to which setting value may be allowed to be viewed.

Embodiment 3

In the network diagram illustrated in FIG. 1, the server computer group 105 assumes that the setting value management service 310 is performed, but the configuration is not limited to such an example. For example, the server computer group may be configured from only one server computer 210A. Alternatively, the server computer group 105 may be configured in the user environment 100, the service provider environment 110, or the vendor environment 120 of an image forming apparatus.

In the network diagram illustrated in FIG. 1, it is assumed that the service provider uses the terminal apparatus 102E arranged in the service provider environment 110, but the configuration is not limited to such an example. For example, the service provider may use the terminal apparatus 102D arranged in the user environment 100 with the permission of the user.

In the hardware configuration diagram illustrated in FIG. 2, communication is performed between the server computers 210A and 210B over the network 220, but the configuration is not limited to such an example. For example, the server computers 210A and 210B may communicate with one another over the Internet 104.

In the software configuration diagram illustrated in FIG. 3, the real configuration data holding section 301 stores the real configuration data in the auxiliary storage apparatus 204A, but the configuration is not limited to such an example. For example, the data may be temporarily stored in the volatile memory 203A. In this case, the real configuration data will be lost when the power is turned off, and thus, the virtual configuration data receiving section 303 has to receive virtual configuration data every time the power of the device is turned on. More specifically, the decision of step S1004 in FIG. 14 regarding update of virtual configuration data does not have to be performed, whereas step S1007 will always be performed.

In the software configuration diagram illustrated in FIG. 3, the real appliance element data collection section 304 collects the real appliance element data every time the power of the image forming apparatus is turned on, but the configuration is not limited to such an example. For example, the real appliance element data holding section may store the real appliance element data in the auxiliary storage apparatus 204A at all times. In this case, the real appliance element data held by the real appliance element data holding section has to be promptly rewritten according to a change in the real appliance element data. Accordingly, the real appliance element data collection section 304 has to monitor the real appliance element data, and, upon detection of a change in the contents, has to notify the real appliance element data holding section of the contents of change. Also, the real appliance element data notification section 306 is to request the real appliance element data holding section for the real appliance element data.

In the software configuration diagram illustrated in FIG. 3, the tenant identifier holding section 305 stores the tenant identifier in the auxiliary storage apparatus 204A, but the configuration is not limited to such an example. For example, a user may input the tenant identifier using the input apparatus 206A each time. The timing of input may be the time of activation of the image forming apparatus, or it may be another timing. In this case, the tenant identifier is stored in the volatile memory 203A.

In the software configuration diagram illustrated in FIG. 3, the real appliance element data notification section 306 performs a process upon detection of turning on of power of the image forming apparatus, but the configuration is not limited to such an example. For example, a user may instruct acquisition of virtual configuration data using the input apparatus 206A. In this case, the process of step S1002 and thereafter is performed when the instruction for acquisition of the virtual configuration data is detected in step S1001 in FIG. 14.

In the software configuration diagram illustrated in FIG. 3, the virtual device holding section 311 holds identifiers used for identifying virtual appliance element data and virtual configuration data as illustrated in FIG. 6, but the configuration is not limited to such an example. For example, a data entity may be held instead of an identifier.

In the software configuration diagram illustrated in FIG. 3, the virtual configuration data generation section 316 generates the virtual configuration data from the model-specific setting value schema, the configuration data for a tenant and the virtual appliance element data, but the configuration is not limited to such an example. For example, the virtual configuration data generation section 316 may generate virtual configuration data according to the model from the model-specific setting value schema and the configuration data for a tenant. In this case, the image forming apparatus refers to the real configuration data according to the appliance configuration.

As another example, the virtual configuration data may be generated further using license data. In this case, virtual configuration data according to the optional functions of the image forming apparatus is generated.

With the virtual device information illustrated in FIG. 6, one notification flag 806 is provided for each virtual device, but the notification flag may be provided for each piece of virtual configuration data. In this case, control is enabled where only the configuration data which is changed is transmitted to the image forming apparatus.

With the real configuration data illustrated in FIGS. 4A and 4B, only one notification flag 1105 is provided, but the notification flag may be provided for each piece of real configuration data. In this case, control is enabled where only the configuration data which is changed is transmitted to the setting value management service 310.

Other Embodiments

Furthermore, the present invention is also realized by the following process. That is, by supplying software (program) for realizing the functions of the embodiments described above to a system or an apparatus over a network or various types of storage media, and by the computer (or the CPU or MPU) of the system or the apparatus reading and executing the program.

According to each embodiment described above, when replacing an image forming apparatus with a new apparatus, configuration data, including setting values of setting items which are local prioritized settings, is enabled to be carried over to the new image forming apparatus. Accordingly, at the time of replacing an image forming apparatus with a new apparatus, the trouble of having to manually set the setting items that were adopted as local prioritized setting items by the image forming apparatus before replacement in the image forming apparatus after replacement can be saved.

Accordingly, in the case of replacing an image forming apparatus with a new apparatus, configuration data, including the setting values of setting items which are local prioritized settings, is enabled to be carried over to the new image forming apparatus.

Heretofore, preferable embodiments of the present invention have been described in detail. However, the present invention is not limited to specific embodiments, and various modifications and alterations are possible as long as they are within the scope of the present invention described in the appended claims.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-281986, filed Dec. 22, 2011, which is hereby incorporated by reference herein in its entirety.

What is claimed is:

1. A server apparatus comprising:
    a receiving unit configured to receive a registration request from a first image processing apparatus that is to be newly registered;
    a generation unit configured to generate virtual configuration data including a plurality of setting items;
    an update unit configured to update the virtual configuration data generated by the generation unit with reference to one or more setting items of the plurality of setting items, wherein the one or more setting items correspond to one or more setting items set in virtual configuration data of a second image processing apparatus to be replaced by the first image processing apparatus; and
    a transmission unit configured to transmit the virtual configuration data updated by the update unit to the first image processing apparatus.

2. The server apparatus according to claim 1,
    wherein the generation unit generates the virtual configuration data based on appliance element data of the first image processing apparatus, and
    wherein the update unit updates the virtual configuration data generated by the generation unit by overwriting the one or more setting items included in the virtual configuration data of the first image processing apparatus by the corresponding one or more setting items set in the virtual configuration data of the second image processing apparatus.

3. The server apparatus according to claim 2, wherein the registration request received by the receiving unit includes tenant identification information and the appliance element data, and wherein the generation unit searches for a virtual device matching the tenant identification information and the appliance element data, updates the virtual appliance element data by assuming virtual appliance element data of the virtual device which has been retrieved to be the appliance element data, acquires a model code from the virtual appliance element data which has been updated and acquires a model-specific setting value schema corresponding to the model code which has been acquired, and also, acquires configuration data for a tenant that matches the tenant identification information, to thereby generate virtual configuration data from the virtual appliance element data, the model-specific setting value schema and the configuration data for a tenant.

4. The server apparatus according to claim 1, further comprising:
    a display unit configured to display, on a display apparatus, a selection screen on which a manipulator performs selection, the selection screen including a plurality of image processing apparatuses to be replaced by the first image processing apparatus,
    wherein the setting unit sets an image processing apparatus selected on the selection screen as the second image processing apparatus to be replaced by the first image processing apparatus.

5. The server apparatus according to claim 1, further comprising
    a setting unit configured to set a plurality of image processing apparatuses to be replaced by the first image processing apparatus,
    wherein, if temporary identification information is included in the registration request received by the receiving unit, the update unit specifies the plurality of image processing apparatuses to be replaced based on pieces of identification information associated with the temporary identification information, and updates the virtual configuration data with local prioritized settings of the plurality of image processing apparatuses to be replaced.

6. The server apparatus according to claim 5,
wherein the setting unit sets the plurality of image processing apparatuses to be replaced by the first image processing apparatus together with priority ranks, and
wherein, if the temporary identification information is included in the registration request received by the receiving unit, the update unit specifies the plurality of image processing apparatuses to be replaced and the priority ranks of the plurality of image processing apparatuses to be replaced, based on the pieces of identification information associated with the temporary identification information, and updates the virtual configuration data with local prioritized settings of the plurality of image processing apparatuses to be replaced, based on the priority ranks.

7. The server apparatus according to claim 5,
wherein the setting unit sets a plurality of image processing apparatuses to be replaced by the first image processing apparatus for respective setting items, and
wherein, if the temporary identification information is included in the registration request received by the receiving unit, the update unit specifies the plurality of image processing apparatuses to be replaced and the setting items based on the pieces of identification information associated with the temporary identification information, and updates the virtual configuration data with the local prioritized settings of the plurality of image processing apparatuses to be replaced, based on the setting items.

8. A system including a server apparatus and a plurality of image processing apparatuses capable of communicating with the server apparatus over a network,
wherein the server apparatus comprises:
a first receiving unit configured to receive a registration request from a first one of the plurality of image processing apparatuses to be newly registered;
a generation unit configured to generate virtual configuration data including a plurality of setting items;
a first update unit configured to update the virtual configuration data generated by the generation unit with reference to one or more of the plurality of setting items, wherein the one or more setting items correspond to one or more setting items set in virtual configuration data of a second one of the plurality of image processing apparatuses to be replaced by the first image processing apparatus; and
a first transmission unit configured to transmit the virtual configuration data updated by the first update unit to the first image processing apparatus, and
wherein the first image processing apparatus comprises:
a second transmission unit configured to transmit the registration request to the server apparatus;
a second receiving unit configured to receive the virtual configuration data transmitted by the first transmission unit; and
a second update unit configured to update real configuration data using the virtual configuration data received by the second receiving unit.

9. An information processing method performed by a server apparatus, the method comprising:
receiving a registration request from a first image processing apparatus to be newly registered;
generating virtual configuration data including a plurality of setting items;
updating the virtual configuration data generated in the generating step with reference to one or more of the plurality of setting items, wherein the one or more setting items correspond to one or more setting items set in virtual configuration data of a second image processing apparatus to be replaced by the first image processing apparatus; and
transmitting the virtual configuration data updated in the updating step to the first image processing apparatus.

10. An information processing method of a system including a server apparatus and a plurality of image processing apparatuses capable of communicating with the server apparatus, the method comprising:
in the server apparatus:
a first receiving step of receiving a registration request from a first one of the image processing apparatuses to be newly registered;
generating virtual configuration data including a plurality of setting items;
a first updating step of updating the virtual configuration data generated in the generating step with reference to one or more of the plurality of setting items, wherein the one or more setting items correspond to one or more setting items set in virtual configuration data of a second image processing apparatus to be replaced by the first image processing apparatus; and
a first transmission step of transmitting the virtual configuration data updated in the first updating step to the first image processing apparatus; and
in the first image processing apparatus:
a second transmission step of transmitting the registration request to the server apparatus;
a second receiving step of receiving the virtual configuration data transmitted by the first transmission step; and
a second updating step of updating, in the first image processing apparatus, real configuration data using the virtual configuration data received in the second receiving step.

11. A non-transitory computer-readable storage medium storing a computer program for causing a computer to execute the information processing method according to claim 9.

* * * * *